United States Patent
Soborski

(10) Patent No.: US 10,546,171 B2
(45) Date of Patent: Jan. 28, 2020

(54) METHOD AND SYSTEM FOR DETERMINING AN AUTHENTICITY OF A BARCODE USING EDGE LINEARITY

(71) Applicant: SYS-TECH SOLUTIONS, INC., Princeton, NJ (US)

(72) Inventor: Michael L. Soborski, Allentown, NJ (US)

(73) Assignee: SYS-TECH SOLUTIONS, INC., Princeton, NJ (US)

( * ) Notice: Subject to any disclaimer, the term of this patent is extended or adjusted under 35 U.S.C. 154(b) by 0 days.

(21) Appl. No.: 16/535,765

(22) Filed: Aug. 8, 2019

(65) Prior Publication Data

US 2019/0362114 A1 Nov. 28, 2019

Related U.S. Application Data

(63) Continuation of application No. 16/122,354, filed on Sep. 5, 2018, now Pat. No. 10,387,703, which is a
(Continued)

(51) Int. Cl.
*G06K 9/46* (2006.01)
*G06T 7/13* (2017.01)
(Continued)

(52) U.S. Cl.
CPC ......... *G06K 7/146* (2013.01); *G06K 9/00577* (2013.01); *G06K 9/4604* (2013.01);
(Continued)

(58) Field of Classification Search
CPC ....... G06K 19/06028; G06K 19/06037; G06K 7/1404; G06K 7/1408; G06K 7/1452;
(Continued)

(56) References Cited

U.S. PATENT DOCUMENTS 5,153,418 A 10/1992 Batterman et al.
5,325,167 A 6/1994 Melen
(Continued)

FOREIGN PATENT DOCUMENTS

CN 103279731 A 9/2013
CN 104428798 A 3/2015
(Continued)

OTHER PUBLICATIONS

Ahmed et al., "The structural microscopically analysis for the full color printers & copiers utilized in valuable secured prints counterfeiting crimes," WAN-IFRA, Mar. 3, 2011, 13 pages.
(Continued)

*Primary Examiner* — Suezu Ellis
(74) *Attorney, Agent, or Firm* — Drinker Biddle & Reath LLP

(57) ABSTRACT

An anti-counterfeiting method involves carrying out an image processing operation on an image of the printed genuine barcode including superimposing a best-fit grid on the image and extracting edge linearities of a plurality of modules of the image with respect to the best-fit grid; generating a list of the plurality of modules of the image of the printed genuine barcode (sorted based at least in part on the magnitudes of their respective extracted linearities); carrying out the image processing operation on an image of a printed candidate barcode; generating a list for the plurality of modules of the image of the printed candidate barcode (sorted based at least in part on the magnitudes of their respective extracted linearities); in first and second ranges of magnitudes, comparing the sorted list for the image of the printed genuine barcode with the sorted list for the image of the printed candidate barcode.

4 Claims, 13 Drawing Sheets

Related U.S. Application Data continuation of application No. 14/630,196, filed on Feb. 24, 2015, now abandoned, which is a continuation-in-part of application No. 14/561,215, filed on Dec. 4, 2014, now abandoned, which is a continuation of application No. 13/782,233, filed on Mar. 1, 2013, now Pat. No. 8,950,662.

(60) Provisional application No. 61/605,369, filed on Mar. 1, 2012, provisional application No. 61/676,113, filed on Jul. 26, 2012, provisional application No. 61/717,711, filed on Oct. 24, 2012, provisional application No. 61/945,917, filed on Feb. 28, 2014.

(51) Int. Cl.

| | | |
|---|---|---|
| *G06K 19/06* | (2006.01) | |
| *G06K 9/00* | (2006.01) | |
| *G06K 7/14* | (2006.01) | |
| *G06K 19/08* | (2006.01) | |
| *G07D 7/0043* | (2016.01) | |
| *G06Q 30/00* | (2012.01) | |
| *G06T 7/00* | (2017.01) | |

(52) U.S. Cl.
CPC ..... *G06K 19/06056* (2013.01); *G06K 19/086* (2013.01); *G06Q 30/0185* (2013.01); *G06T 7/0002* (2013.01); *G06T 7/13* (2017.01); *G07D 7/0043* (2017.05); *G06K 2009/0059* (2013.01)

(58) Field of Classification Search
CPC  G06K 7/146; G06K 9/34; G06K 9/46; G06K 9/4604; G06K 9/4638; G06K 9/00577; G06T 2201/0064; G06T 2207/30144; G06T 7/0002; G06T 7/0004; G06T 7/0008; G06T 7/001; G06T 7/10; G06T 7/12; G06T 7/13; G06T 7/136; G06T 7/143; G07D 7/0043; G07D 7/0051; G07D 7/0054; B42D 25/30; B42D 25/305; B42D 25/318; B42D 25/405
See application file for complete search history.

(56) References Cited

U.S. PATENT DOCUMENTS

| | | | |
|---|---|---|---|
| 5,351,834 A | 10/1994 | Duss | |
| 5,465,303 A | 11/1995 | Levison et al. | |
| 5,521,984 A | 5/1996 | Denenberg et al. | |
| 5,563,401 A | 10/1996 | Lemelson | |
| 5,583,950 A | 12/1996 | Prokoski | |
| 5,673,338 A | 9/1997 | Denenberg et al. | |
| 5,706,091 A | 1/1998 | Shiraishi | |
| 5,883,971 A | 3/1999 | Bolle et al. | |
| 5,903,356 A | 5/1999 | Shiraishi | |
| 5,946,103 A | 8/1999 | Curry | |
| 5,978,495 A | 11/1999 | Thomopoulos et al. | |
| 6,032,861 A | 3/2000 | Lemelson et al. | |
| 6,185,318 B1 | 2/2001 | Jain et al. | |
| 6,398,117 B1 | 6/2002 | Oakeson et al. | |
| 6,421,123 B1 | 7/2002 | Shiraishi | |
| 6,460,766 B1 | 10/2002 | Olschafskie et al. | |
| 6,543,691 B1 | 4/2003 | Lemelson et al. | |
| 6,612,494 B1 | 9/2003 | Outwater | |
| 6,760,472 B1 | 7/2004 | Takeda et al. | |
| 6,865,337 B1 | 3/2005 | Muller | |
| 6,922,480 B2 | 7/2005 | Rhoads | |
| 6,970,236 B1 | 11/2005 | Markantes et al. | |
| 7,025,269 B2 | 4/2006 | Marshall | |
| 7,044,376 B2 | 5/2006 | Nelson et al. | |
| 7,080,041 B2 | 7/2006 | Nagel | |
| 7,229,025 B2 | 6/2007 | Sussmeier et al. | |
| 7,264,174 B2 | 9/2007 | Chang et al. | |
| 7,277,891 B2 | 10/2007 | Howard et al. | |
| 7,474,773 B2 | 1/2009 | Chau | |
| 7,526,110 B2 | 4/2009 | Niinuma et al. | |
| 7,533,062 B2 | 5/2009 | Sanchez et al. | |
| 7,576,842 B2 | 8/2009 | Park | |
| 7,577,844 B2 | 8/2009 | Kirovski | |
| 7,616,797 B2 | 11/2009 | Bailey et al. | |
| 7,673,807 B2 | 3/2010 | Simske et al. | |
| 7,697,729 B2 | 4/2010 | Howell et al. | |
| 7,752,077 B2 | 7/2010 | Holden et al. | |
| 7,773,812 B2 | 8/2010 | Hanus et al. | |
| 8,027,468 B2 | 9/2011 | McCloskey | |
| 8,061,611 B2 | 11/2011 | Cheung et al. | |
| 8,194,919 B2 | 6/2012 | Rodriguez et al. | |
| 8,267,321 B2 | 9/2012 | Kuyper-Hammond et al. | |
| 8,542,930 B1 | 9/2013 | Negro et al. | |
| 8,950,662 B2 | 2/2015 | Soborski | |
| 9,548,863 B2 | 1/2017 | Weiss | |
| 10,185,907 B2 | 1/2019 | Lau et al. | |
| 2002/0041712 A1 | 4/2002 | Roustaei et al. | |
| 2002/0087869 A1 | 7/2002 | Kim | |
| 2002/0113127 A1 | 8/2002 | Takeuchi et al. | |
| 2002/0122878 A1 | 9/2002 | Kerns et al. | |
| 2002/0171862 A1 | 11/2002 | Nagashige | |
| 2003/0021452 A1 | 1/2003 | Hamid | |
| 2003/0169456 A1 | 9/2003 | Suzaki | |
| 2004/0161153 A1 | 8/2004 | Lindenbaum | |
| 2004/0263911 A1 | 12/2004 | Rodriguez et al. | |
| 2005/0053236 A1 | 3/2005 | Samii et al. | |
| 2005/0161515 A1 | 7/2005 | Lubow | |
| 2005/0234857 A1 | 10/2005 | Plutchak et al. | |
| 2005/0257064 A1 | 11/2005 | Boutant et al. | |
| 2007/0041622 A1 | 2/2007 | Salva Calcagno | |
| 2007/0170257 A1 | 7/2007 | Haraszti | |
| 2007/0199991 A1 | 8/2007 | Haraszti et al. | |
| 2008/0025555 A1 | 1/2008 | Visan et al. | |
| 2008/0044096 A1 | 2/2008 | Cowburn et al. | |
| 2008/0149725 A1 | 6/2008 | Rosenbaum | |
| 2008/0181447 A1 | 7/2008 | Adams et al. | |
| 2008/0226297 A1 | 9/2008 | Sinclair et al. | |
| 2009/0001164 A1 | 1/2009 | Brock et al. | |
| 2009/0116753 A1 | 5/2009 | Midgley et al. | |
| 2009/0169019 A1 | 7/2009 | Bauchot et al. | |
| 2009/0232368 A1 | 9/2009 | Niinuma et al. | |
| 2009/0274342 A1* | 11/2009 | Wu | B41J 29/393 382/112 |
| 2010/0027851 A1 | 2/2010 | Walther et al. | |
| 2010/0037059 A1 | 2/2010 | Sun et al. | |
| 2011/0121066 A1 | 5/2011 | Tian et al. | |
| 2012/0145779 A1 | 6/2012 | Bietenbeck et al. | |
| 2012/0325902 A1 | 12/2012 | Goyal et al. | |
| 2013/0034290 A1 | 2/2013 | Lee et al. | |
| 2013/0228619 A1 | 9/2013 | Soborski | |
| 2013/0240628 A1 | 9/2013 | van der Merwe et al. | |
| 2013/0296039 A1 | 11/2013 | Engineer et al. | |
| 2014/0061316 A1 | 3/2014 | Narayanaswami et al. | |
| 2014/0078556 A1 | 3/2014 | Anderson, III | |
| 2014/0086474 A1 | 3/2014 | Le | |
| 2015/0061279 A1 | 3/2015 | Cruz et al. | |
| 2015/0083801 A1 | 3/2015 | Soborski | |
| 2015/0098655 A1 | 4/2015 | Chang et al. | |
| 2015/0262347 A1 | 9/2015 | Duerksen et al. | |
| 2015/0379321 A1 | 12/2015 | Soborski et al. | |
| 2016/0342885 A1 | 11/2016 | Toedtli et al. | |
| 2016/0371303 A1 | 12/2016 | Voigt et al. | |
| 2017/0091611 A1 | 3/2017 | Soborski | |
| 2017/0287147 A1 | 10/2017 | Takahashi et al. | |
| 2018/0178579 A1 | 6/2018 | Chen et al. | |

FOREIGN PATENT DOCUMENTS

| | | |
|---|---|---|
| EP | 1 494 135 A2 | 1/2005 |
| GB | 2221870 A | 2/1990 |
| JP | 2004-109172 A | 4/2004 |
| JP | 2005-267598 A | 9/2005 |
| JP | 2009-109419 A | 5/2009 |
| JP | 2009-124599 A | 6/2009 |
| JP | 2012-039494 A | 2/2012 |

(56) References Cited

FOREIGN PATENT DOCUMENTS

| | | |
|---|---|---|
| JP | 2012-141729 A | 7/2012 |
| JP | 2014-203289 A | 10/2014 |
| JP | 2016-028363 A | 2/2016 |
| JP | 2017-516214 A | 6/2017 |
| JP | 2017-532670 A | 11/2017 |
| KR | 10-2003-0051712 A | 6/2003 |
| KR | 10-2005-0093715 A | 9/2005 |
| KR | 10-2008-0031455 A | 4/2008 |
| RU | 2 208 248 C2 | 7/2003 |
| RU | 2 370 377 C2 | 10/2009 |
| RU | 2 380 750 C2 | 1/2010 |
| RU | 2 451 340 C2 | 5/2012 |
| RU | 2 458 395 C2 | 8/2012 |
| RU | 2 461 883 C2 | 9/2012 |
| RU | 2 476 936 C2 | 2/2013 |
| RU | 2 507 076 C2 | 2/2014 |
| WO | 96/03714 A1 | 2/1996 |
| WO | 97/24699 A1 | 7/1997 |
| WO | 02/31752 A1 | 4/2002 |
| WO | 02/065782 A1 | 8/2002 |
| WO | 2005/015487 A1 | 2/2005 |
| WO | 2008/078009 A1 | 7/2008 |
| WO | 2009/044352 A1 | 4/2009 |
| WO | 2009/115611 A2 | 9/2009 |
| WO | 2010/021965 A1 | 2/2010 |
| WO | 2001/077459 A1 | 6/2011 |
| WO | 2011/076406 A1 | 6/2011 |
| WO | 2013/119235 A1 | 8/2013 |
| WO | 2013/130946 A1 | 9/2013 |
| WO | 2015/130697 A1 | 9/2015 |
| WO | 2016/035774 A1 | 3/2016 |

OTHER PUBLICATIONS

Deguillaume et al., "Secure hybrid robust watermarking resistant against tampering and copy-attack," Signal Processing, 2003, vol. 83(10), pp. 2133-2170.
"Rank, v.3", Def. 3a, OED Online, Oxford English Dictionary, 2nd Ed., 1989, Oxford University Press, <http://www.oed.com/oed2/00197225>.
Seo et al., "A robust image fingreprinting system using the Radon transform," Signal Processing: Image Communication, Elsevier Science Publishers, Amsterdam, NL, Apr. 1, 2004, vol. 19 (4), pp. 325-339.
Wikipedia, "Discrete wavelet transform," Nov. 27, 2016, <https://en.wikipedia.org/w/index.php?title=Discrete_wavelet_transform&oldid=751698489>, 10 pages.
Examination Report issued in related application AU 2015383137, dated Aug. 18, 2017, 3 pages.
Notice of Acceptance issued in related application AU 2015223174, dated Aug. 18, 2017, 3 pages.
Notice of Acceptance issued in related application AU 2015383137, dated Nov. 24, 2017, 3 pages.
Notice of Acceptance issued in related application AU 2016278954, dated May 9, 2018, 3 pages.
Examination Report issued in related application AU 2016278954, dated Jan. 31, 2018, 6 pages.
Examination Report issued in related application AU 2017234124, dated Sep. 25, 2018, 2 pages.
Notice of Acceptance issued in related application AU 2017234124, dated Nov. 13, 2018, 3 pages.
Examination Report issued in related application AU 2017370656, dated Jul. 18, 2019, 5 pages.
Office Action issued in related application CA 2,960,716, dated Apr. 13, 2017, 4 pages.
Office Action issued in related application CA 2,960,716, dated Dec. 27, 2017, 5 pages.
Office Action issued in related application CN 201580076348.1, dated Mar. 15, 2018, with English language translation, 16 pages.
Office Action issued in related application CN 201580062910.5, dated Jan. 30, 2018, with English language translation, 9 pages.
Office Action issued in related application CN 201780017503.1, dated Apr. 29, 2019, with English language translation, 10 pages.
Office Action issued in related application CN 201580022895.1, dated Sep. 21, 2018, with English language translation, 23 pages.
Extended European Search Report issued in related application EP 15755854.5, dated Feb. 27, 2017, 11 pages.
Supplementary European Search Report issued in related application EP 15844793.8, dated Sep. 13, 2017, 4 pages.
Examination Report issued in related application EP 15844793.8, dated Oct. 6, 2017, 8 pages.
Supplementary European Search Report issued in related application EP 15882884.8, dated Dec. 14, 2017, 4 pages.
Third Party Observation filed in related application EP 13754659.4, dated Nov. 3, 2017, 3 pages.
Extended European Search Report issued in related application EP 16812194.5, dated May 11, 2018, 7 pages.
Extended European Search Report issued in related application EP 13754659.4, dated Oct. 14, 2015, 7 pages.
Examination Report issued in related application EP 15882884.8, dated Jan. 23, 2018, 7 pages.
Supplementary European Search Report issued in related application EP 17767261.5, dated Mar. 6, 2019, 4 pages.
Examination Report issued in related application EP 17767261.5, dated Mar. 14, 2019, 8 pages.
Examination Report issued in related application EP 16812194.5, dated Jun. 7, 2019, 5 pages.
Office Action issued in related application IL 256161, dated May 31, 2018, with partial English language translation, 3 pages.
Office Action issued in related application IL 253685, dated Jan. 6, 2018, with English language translation, 6 pages.
Examination Report issued in related application in 7110/DELNP/2014, dated Feb. 25, 2019, 6 pages.
Office Action issued in related application JP 2016-565026, dated Feb. 3, 2017, with English language translation, 12 pages.
Office Action issued in related application JP 2017-515692, dated Aug. 2, 2017, with English language translation, 5 pages.
Office Action issued in related application JP 2017-564394, dated May 14, 2018, with English language translation, 4 pages.
Office Action issued in related application JP 2017-541598, dated Mar. 7, 2018, with English language translation, 4 pages.
Decision to Grant Patent issued in related application JP 2017-515692, dated Jan. 10, 2018, with English language translation, 6 pages.
Notice of Allowance issued in related application JP 2017-564394, dated Oct. 31, 2018, with English language translation, 6 pages.
Office Action issued in related application JP 2018-544333, dated Jan. 31, 2019, with English language translation, 4 pages.
Office Action issued in related application KR 10-2017-7026160, dated Nov. 21, 2017, with English language translation, 11 pages.
Office Action issued in related application KR 10-2015-7020798, dated Jul. 11, 2016, with English language translation, 14 pages.
Office Action issued in related application KR 10-2017-7026160, dated Feb. 22, 2018, with English language translation, 19 pages.
Office Action issued in related application KR 10-2018-7001086, dated Feb. 22, 2018, with English language translation, 15 pages.
Notice of Allowance issued in related application KR 10-2018-7029209, dated Mar. 7, 2019, with English language translation, 3 pages.
Examination Report issued in related application MY PI2014002470, dated Nov. 15, 2017, 3 pages.
Examination Report issued in related application MY PI2016001571, dated Apr. 25, 2019, 3 pages.
Office Action issued in related application MX/2019/009648, dated Mar. 8, 2019, with machine generated English language translation, 7 pages.
PCT Search Report and Written Opinion issued in related application PCT/US2015/051517, dated Jan. 11, 2016, 10 pages.
PCT Search Report and Written Opinion issued in related application PCT/US2017/022097, dated May 24, 2017, 17 pages.
PCT Search Report and Written Opinion issued in related application PCT/US2017/064900, dated Jan. 12, 2018, 8 pages.
Search Report issued in related application RU 2016138293/08, dated Feb. 7, 2017, with English language translation, 4 pages.

(56) References Cited

OTHER PUBLICATIONS

Decision to Grant issued in related application RU 2018101250, dated Apr. 19, 2018, with English language translation, 22 pages.
Decision to Grant issued in related application RU 2017132260, dated Jan. 10, 2018, with English language translation, 27 pages.
Decision to Grant issued in related application RU 2018136107, dated Jan. 16, 2019, with English language translation, 30 pages.

* cited by examiner

*Low res* -------------------------------------------------------------------------------> *High res*
Module pigmentation -> Module Position Bias -> Void/Mark Locations -> Edge Shape Projection

METHOD AND SYSTEM FOR DETERMINING AN AUTHENTICITY OF A BARCODE USING EDGE LINEARITY

CROSS-REFERENCE TO RELATED APPLICATIONS

The present application is a continuation of U.S. patent application Ser. No. 16/122,354, filed Sep. 5, 2018, now U.S. Pat. No. 10,387,703, which is a continuation of U.S. patent application Ser. No. 14/630,196, filed Feb. 24, 2015, abandoned, which is a continuation-in-part of U.S. patent application Ser. No. 14/561,215 filed Dec. 4, 2014, abandoned, which is a continuation of U.S. patent application Ser. No. 13/782,233, filed Mar. 1, 2013, now U.S. Pat. No. 8,950,662, which claims benefit of U.S. Provisional Patent Applications No. 61/605,369, filed Mar. 1, 2012; No. 61/676,113, filed Jul. 26, 2012; and No. 61/717,711, filed Oct. 24, 2012. The contents of each of these documents are incorporated herein by reference. U.S. patent application Ser. No. 14/630,196 also claims benefit of U.S. Provisional Patent Application No. 61/945,917 filed Feb. 28, 2014, the contents of which are incorporated herein by reference.

TECHNICAL FIELD

The present disclosure is related generally to machine vision technology and, more particularly, to methods and a system for verifying the identity of a printed item.

BACKGROUND

Some current methods for verifying the identity of a printed item are generally based on overt or covert marks deliberately applied to an item, usually by printing. Other methods rely on natural variations in a material substrate (fiber orientation in paper, for example) to be used as a unique identifier. Significant deficiencies exist in the existing technology. These include the need to deliberately add overt or covert marks to the item in addition to any marks already present on the item for other purposes. In the case of the substrate variation method, a specialized system that perceives the variations is necessary. Also, for substrates that do not present a readily identifiable unique feature (some plastic films for example) this method cannot be employed. These deficiencies seriously reduce the utility of these methods in the technical fields considered here.

DRAWINGS

While the appended claims set forth the features of the present techniques with particularity, these techniques, together with their objects and advantages, may be best understood from the following detailed description taken in conjunction with the accompanying drawings of which:

DESCRIPTION

Figure 1:
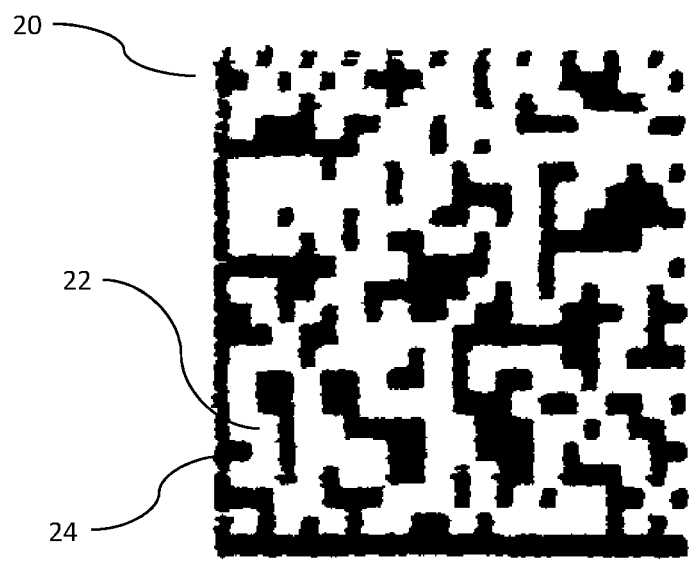
FIG. 1 is an illustration of an instance of a printed mark made use of by methods according to an embodiment.

The present disclosure relates to using variations that were previously regarded as too small to be reliable for validation to detect certain categories of mechanical copies of genuine items.

Aspects of the present disclosure are in the technical field of anti-counterfeiting and item serialization for the purposes of track-and-trace supply chain security.

In one embodiment, for example, an original item printed using a thermal transfer or ink-jet process typically has highly uniform, solid, black or other printed areas. Electrostatic printing processes tend to produce printed areas in which the blacks are grayer at low resolutions and mottled at high resolutions. The difference is subtle, but by the techniques disclosed in this specification, the difference can be detected with sufficient confidence, in a sufficient proportion of instances, to be helpful in distinguishing a thermal transfer printed original from a photocopy of that original.

One disclosed embodiment provides a method of verifying an identity of a printed item, comprising: examining an unverified item for unverified artifacts specific to the unverified item; extracting information associated with the unverified artifacts; retrieving stored data containing information associated with original artifacts of an original item from a storage device; ranking the unverified information according to a magnitude of a characteristic of either the unverified artifacts or the original artifacts; comparing the ranked information associated with the unverified artifacts and the information associated with the original artifacts correspondingly ranked separately for artifacts in a first range of magnitudes and artifacts in a second range of magnitudes, wherein the second range includes artifacts smaller than a smallest artifact in the first range; and when a difference between the information associated with the unverified artifacts and the information associated with the original artifacts is greater for the second range than for the first range by more than a threshold amount, identifying the unverified item as a copy.

In the present application, "printed" is to be understood broadly, as including any process generating a symbol that could reasonably be imitated by an imaging process. The disclosed methods are especially (though not exclusively) concerned with detecting photocopies, so a "printed item" includes anything that can plausibly be photocopied. That includes not only processes of applying a pattern of ink, pigment, dye, or the like of one color (not necessarily black or blackish) to a substrate of a second color (not necessarily white or whitish) but also ablative processes, in which a surface layer or coating of the second color is initially present, and part of it is removed to create the pattern. References to a "printer" are to be understood correspondingly broadly.

As is explained in more detail below, the "artifacts smaller than a smallest artifact in the first range" may include, or consist of, locations where there is no artifact at all, or no artifact detectable over the statistical noise of the detection system, or only noise is detected.

The difference may be an average or aggregate difference in or ratio of magnitudes of artifacts or a statistical measure of variation in magnitudes of artifacts.

An embodiment further comprises, before comparing separately: comparing the information associated with the unverified artifacts and the information associated with the original artifacts for artifacts having magnitudes in the first range; assessing a statistical probability that the unverified artifacts' information matches the original artifacts' information; in the case the statistical probability exceeds a first threshold, determining that the unverified item is a verified original item; in the case the statistical probability is below a second threshold lower than the first threshold, determining that the unverified item is not an original item; and carrying out the step of comparing separately only in the case the statistical probability is between the first and second thresholds.

The first range may consist of a predetermined number of artifacts having largest magnitudes, and/or the second range may consist of a predetermined number of artifacts having smallest magnitudes or smallest magnitudes above a detection threshold. The first and second ranges may overlap.

An embodiment further comprises calculating an autocorrelation series of the ranked unverified artifacts' information for each of the first and second ranges, where the comparing separately comprises comparing the unverified and original autocorrelation series for each of the first and second ranges. The stored data may comprise data representing autocorrelation series of the ranked original item artifacts for each of the first and second ranges, or the autocorrelation series for the original item artifacts may be generated only at the time of comparison.

At least some of the artifacts may be artifacts of a symbol that encodes data and supports error detection, and extracting information representing the unverified artifacts may then include determining an error state of a symbol having the unverified artifacts. The error state may indicate that part of the symbol is damaged, and the comparing may then comprise discounting artifacts in the damaged part of the symbol.

In general, "discounting" an artifact includes giving that artifact lower statistical ranking than otherwise comparable artifacts, placing that artifact in a separate class of artifacts that cannot be accurately quantified and/or ranked, treating that artifact in the same way as a location with no detected artifact of that category, and totally ignoring that artifact. Different ones of those approaches may be applied at different points even within a single embodiment.

The comparing may include correcting for properties of at least one of apparatus that created the original artifacts, apparatus used in examining the original item for the information representing the original artifacts, and apparatus used in examining the unverified item for the information representing the unverified artifacts.

The artifacts may be of distinct categories. Determining whether the unverified artifacts' information matches the original artifacts' information may then comprise comparing the unverified and original artifacts in each category and combining the results of the comparisons. The correcting may then comprise weighting the combining according to a known tendency of the apparatus that created the original artifacts to produce artifacts in different categories with different frequencies or different values of a characteristic.

An embodiment further comprises: examining an original printed item for artifacts specific to the item; extracting information associated with the artifacts; ranking the information according to a characteristic of the artifacts; and storing data representing the ranked information as said stored data in a non-transitory computer readable storage device separate from the original item.

At least some of the artifacts may be artifacts that were not controllably producible in producing the original item.

The original item may comprise a mark that comprises an identifier and at least one artifact, wherein the identifier is associated with the original item and the at least one artifact does not alter the association. The storing may then comprise storing the information so as to be at least partially locatable using the identifier.

An embodiment provides a system for verifying the identity of an item by the above method, comprising a verifying scanner operable to examine an unverified item and extract information representing unverified artifacts of the unverified item, and a processor operable to retrieve from a storage device stored data containing information representing ranked original artifacts of an original item, compare the unverified and original artifacts' information, and produce an output dependent on the result of the comparison.

An embodiment provides a system for verifying the identity of an item by the above method, comprising an original item scanner operable to examine an item and extract information representing artifacts of the item, an encoder operable to rank the information according to a characteristic of the artifacts and to encode the extracted information into computer readable data, and a computer readable storage device operable to store the data.

The system may further comprise an original item producer operable to produce an original item, wherein the artifacts are features of the item that are produced when the original item producer produces the item, and at least some of the artifacts are not controllably producible by the original item producer.

The system may further comprise at least one original item for which ranked artifact data is stored in a computer readable storage device.

An embodiment provides a non-transitory computer-readable storage media storing computer-readable instructions that, when executed on a suitable computing processor, verify the identity of an item according to any of the above methods.

An embodiment provides a method of verifying an identity of a printed item, comprising: imaging printed areas of an unverified printed item; extracting information associated with the spatial contrast of the printed areas; retrieving from a storage device stored data containing information associated with the spatial contrast of corresponding printed areas of an original item; comparing the information associated with the spatial contrast of the printed areas of the unverified printed item and the original printed item; and when a difference between the information associated with the spatial contrast of the printed areas of the unverified printed item and the original printed item is greater more than a threshold amount, identifying the unverified item as a copy.

The information associated with the spatial contrast of the printed areas may be a moment of inertia of a gray-level co-occurrence matrix.

Respective information from a plurality of marks or other printed items may be stored in one storage device, for example in the form of a database, and using the identifier from one of said marks, the respective information from a number of marks smaller than said plurality of marks and comprising said one mark may be retrievable. In an example, the identifier may identify a group or category of items. The identifier can then be used to retrieve from the database only the stored information relating to items in that group or category, reducing the extent of a subsequent search to identify the information on a single item. In another example, the smaller number of marks may be only the one mark. For example, the identifier may be a Unique Identifier (UID) that explicitly identifies only a single item, and the information may be stored so as to be retrievable using the UID.

The stored information may include information indicative of a type of the printer involved in creating the original artifacts. The stored information may include information indicative of a resolution of the apparatus involved in examining the original item.

Where the artifacts are of distinct categories, determining whether the unverified artifacts' information matches the original artifacts' information may comprise comparing the detected artifacts in each category and combining the results of the comparisons, and the correcting may then comprise weighting the combining according to a known tendency of the apparatus that created the original artifacts to produce artifacts in different categories with different frequencies or different magnitudes.

The extracting of information may further comprise determining a type of printer used in producing the artifacts, where the artifacts are of a plurality of distinct categories. Encoding the ranked original artifacts' information and storing may then comprise at least one of ranking different categories of artifacts according to the type of printer, and storing data indicating the type of printer as part of the stored data. The information may be useful, because different types of printers can produce different categories of artifacts with different magnitude ranges, more or less frequently, or with other variations that may affect how to assess or how much weight to give to different categories of artifact.

Other information relating to the original item may be incorporated in the stored data in addition to the information representing the original artifacts. The other original item information may include a serial number specific to the original item. Such other information may then be recovered from the retrieved stored data additionally to the information representing the original artifacts.

Where at least some of the artifacts are artifacts of a symbol that encodes data, and the encoded data include a Unique Identifier (UID) for an individual instance of the symbol or other identifying data, the stored data may be stored so as to be retrievable under an identifier derivable from the UID or other identifying data. Where the other identifying data only partially identifies the symbol, for example, identifies a category or group of items smaller than all the items for which data is stored in a database, the data may be stored so that the stored data for the category or group are retrievable under an identifier derivable from the other identifying data. The stored data for a desired individual original item may then be retrieved by a further search within the retrieved group.

Where encoding the ranked original artifacts' information comprises calculating an autocorrelation series of the ranked original artifacts' information, encoding may further comprise representing or approximating the autocorrelation series as a polynomial to a fixed order. The approximation may be to a polynomial of a predetermined order, and the coefficients may be approximated to a predetermined precision.

Where encoding the ranked original artifacts' information comprises calculating an autocorrelation series of the ranked original artifacts' information, comparing may comprise calculating an autocorrelation series of the unverified artifacts' information, and comparing the two autocorrelation series. Comparing may further or alternatively comprise comparing Discrete Fourier Transform (DFT) power series of the two autocorrelation series, and may then comprise comparing at least one of the Kurtosis and Distribution Bias functions of the DFT power series.

The verifying scanner may be coupled to a point of sale device. The verifying scanner may be embodied in a cell phone.

In many embodiments, it is preferred that the artifacts be features that do not affect, or at least do not diminish, the function or commercial value of the mark, item, or object in which they appear.

A better understanding of various features and advantages of the present methods and devices may be obtained by reference to the following detailed description of illustrative embodiments and accompanying drawings. Although these drawings depict embodiments of the contemplated methods and devices, they should not be construed as foreclosing alternative or equivalent embodiments apparent to those of ordinary skill in the subject art.

In an embodiment, a method operates on marks that are applied to items. These marks may be for the purpose of uniquely identifying an item, as with a serial number for example, or they may be marks that are for other purposes, such as branding, labeling or decoration. These marks may be printed, etched, molded, formed, transferred, or otherwise applied to the item using various processes. The marks are acquired such that they can be processed in electronic form. Methods of electronic acquisition are varied, and can include, but are not limited to, machine vision cameras, bar code readers, line scan imagers, flat-bed scanners, hand-held portable imaging devices, or many other means.

Referring now to the drawings, in FIG. 1 there is shown an example of a printed mark indicated generally by the reference number 20 to which the present methods may be applied. In this example the printed mark is a 2-dimensional barcode. This barcode is a data-carrier of information, where the information is encoded as a pattern of light areas 22 and dark areas 24 in the mark. An ideal instance of the 2-D barcode would consist of a rectangular grid, with each cell or "module" 22, 24 in the grid either black or white, representing a bit of data.

Figure 2:
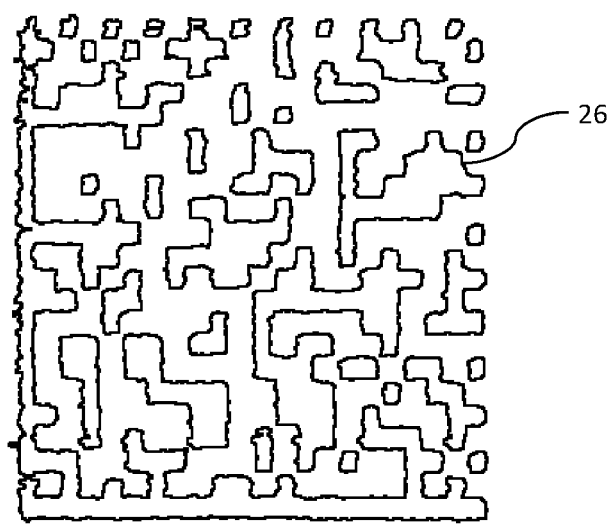
FIG. 2 is an illustration of the mark in FIG. 1 with the mark's edge features extracted for clarity.

FIG. 2 provides an enhanced view of some of the variations present in the mark shown in FIG. 1. FIG. 2 shows only the edges 26 between light and dark areas of the mark shown in FIG. 1. Features such as edge linearity, region discontinuities, and feature shape within the mark shown in FIG. 1 are readily apparent. Numerous irregularities along the edges of the mark's printed features are clearly visible. Note that this illustration is provided for clarity and is not necessarily a processing step of the present methods. In some of the embodiments postulated herein such edge extraction is beneficial and therefore utilized. In some of the embodiments, features other than edges are extracted.

Figure 3:
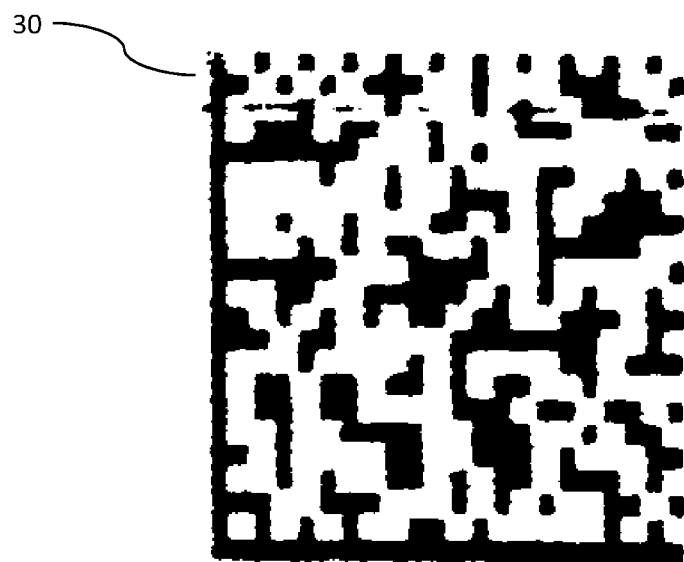
FIG. 3 is an illustration of a second instance of the same mark as in FIG. 1, which may represent a counterfeit version of the mark in FIG. 1.

FIG. 3 shows an example of a second printed mark, indicated generally by the reference number 30, which may represent a counterfeit of the mark 20 shown in FIG. 1, or may represent a second unique instance of the mark for identification purposes. This second printed mark 30 is also a 2-dimensional barcode. This second barcode 30, when read with a 2-dimensional barcode reader, presents exactly the same decoded information as the mark 20 of FIG. 1. When the mark 30 of FIG. 3 is acquired, the present embodiment again identifies significant features and captures them as "signature" data that uniquely identifies the mark. As in the case of FIG. 1, this signature data is derived from the physical and optical characteristics of the mark's geometry and appearance, and in addition, can include data that is encoded in the mark, should the mark be a data-carrying symbol such as a 2-dimensional barcode. The properties of the mark evaluated for creating the signature data are usually the same properties used in evaluating the first instance of the mark, so that the two signatures are directly comparable.

Figure 4:
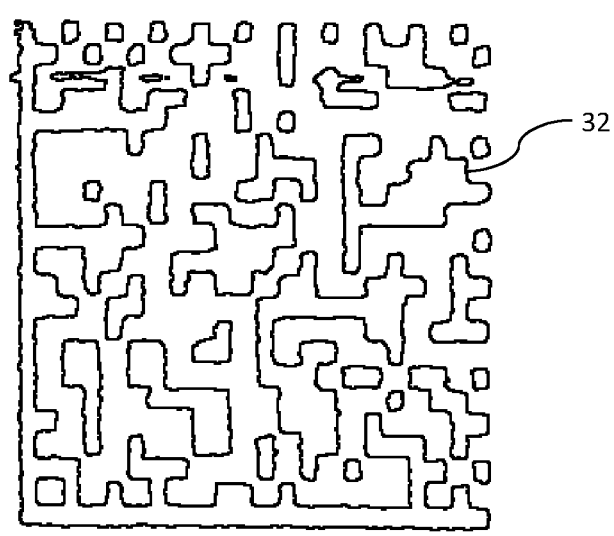
FIG. 4 is an illustration of the mark in FIG. 3 with the mark's edge features extracted for clarity.

FIG. 4 provides an enhanced view of some of the variations present in the mark 30 shown in FIG. 3. FIG. 4 shows only the edges 32 of the mark shown in FIG. 3, similarly to FIG. 2. The corresponding features and variations, such as edge linearity, region discontinuities, and feature shape within the mark shown in FIG. 3 are readily apparent. Examples of some of the features that may be used are shown in more detail in FIG. 5, which is discussed in more detail below.

Figure 6:
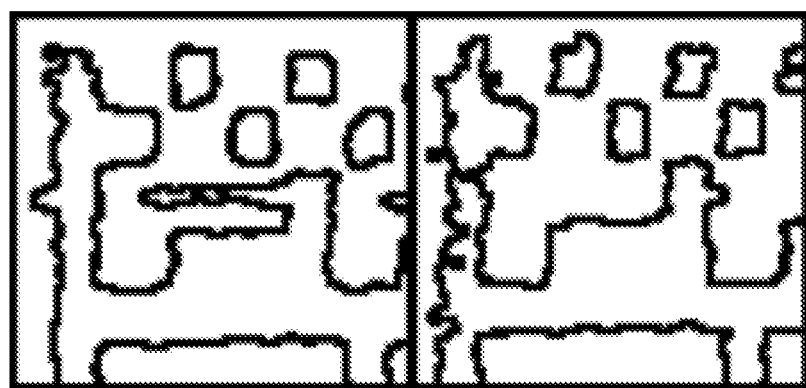
FIG. 6 is an illustration comparing the features of the upper left sections of FIG. 2 and FIG. 4.

FIG. 6 shows a close comparison of the upper left corner features of FIG. 2 and FIG. 4. As may be seen most clearly in FIG. 6, the two printed marks 20, 30 of FIGS. 1 and 3, even though identical in respect of their overtly coded data, contain numerous differences on a finer scale, resulting from the imperfections of the printing process used to apply the marks. These differences are durable, usually almost as durable as the mark itself, and are for practical purposes unique, especially when a large number of differences that can be found between the symbols of FIG. 1 and FIG. 3 are combined. Further, the differences are difficult, if not almost impossible, to counterfeit, because the original symbol would have to be imaged and reprinted at a resolution much higher than the original printing, while not introducing new distinguishable printing imperfections. While only the upper left corner section of the marks is shown here, differentiable features between the two marks shown in FIGS. 1 and 3 run throughout the entirety of the marks and can be utilized by the present embodiment.

Figure 5:
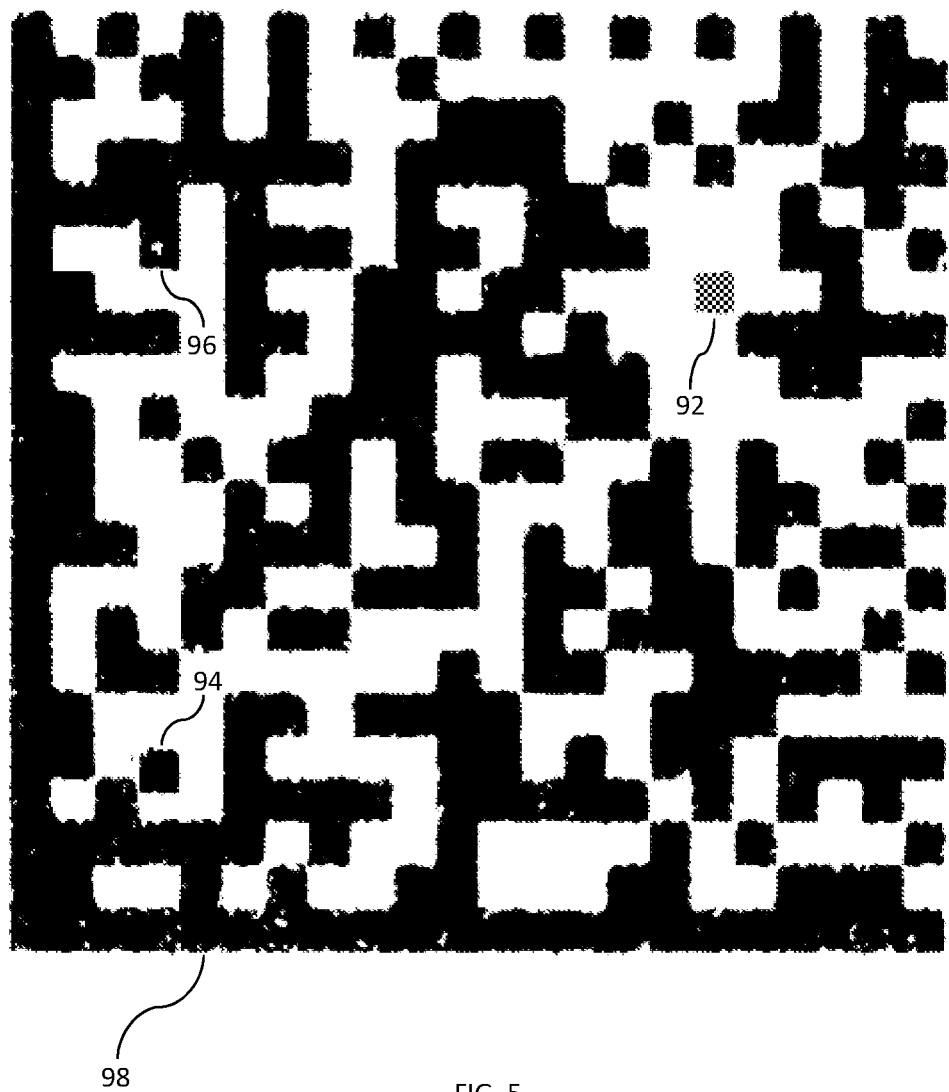
FIG. 5 is an example of a 2-D data matrix printed by a thermal transfer process, illustrating some features that may be used in the present methods.
Figure 7:
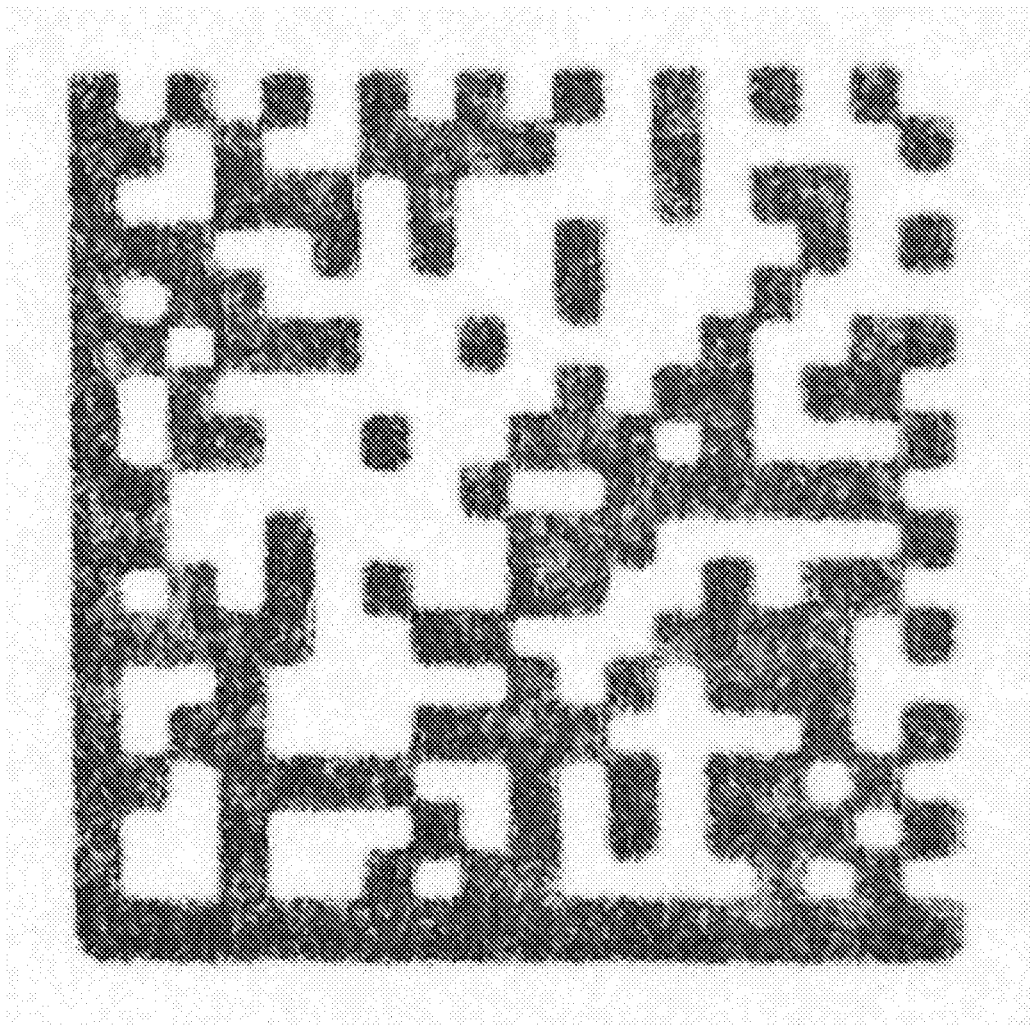
FIG. 7 is an example of a photocopy of a data matrix similar to that of FIG. 5.

FIG. 5 is an example of a 2-D barcode printed using a thermal transfer printer. As may be seen from FIG. 5, the thermal transfer printer produces an image with solid blacks. Ablative processes, in which a substrate initially has a continuous black coating, parts of which are removed to produce the white areas in FIG. 5, can also produce an image with solid blacks. FIG. 7 is an example of a photocopy of a 2-D barcode, similar in general structure to the barcode of FIG. 5. As may be seen from FIG. 7, the electrostatic process used by photocopiers tends to produce a mottled or speckled effect, so that many cells of the barcode that would be perceived as solid black in FIG. 5 are perceived in FIG. 7 as gray rather than black, and/or as black with white voids. The significance of this difference is explained in more detail below.

Figure 8:
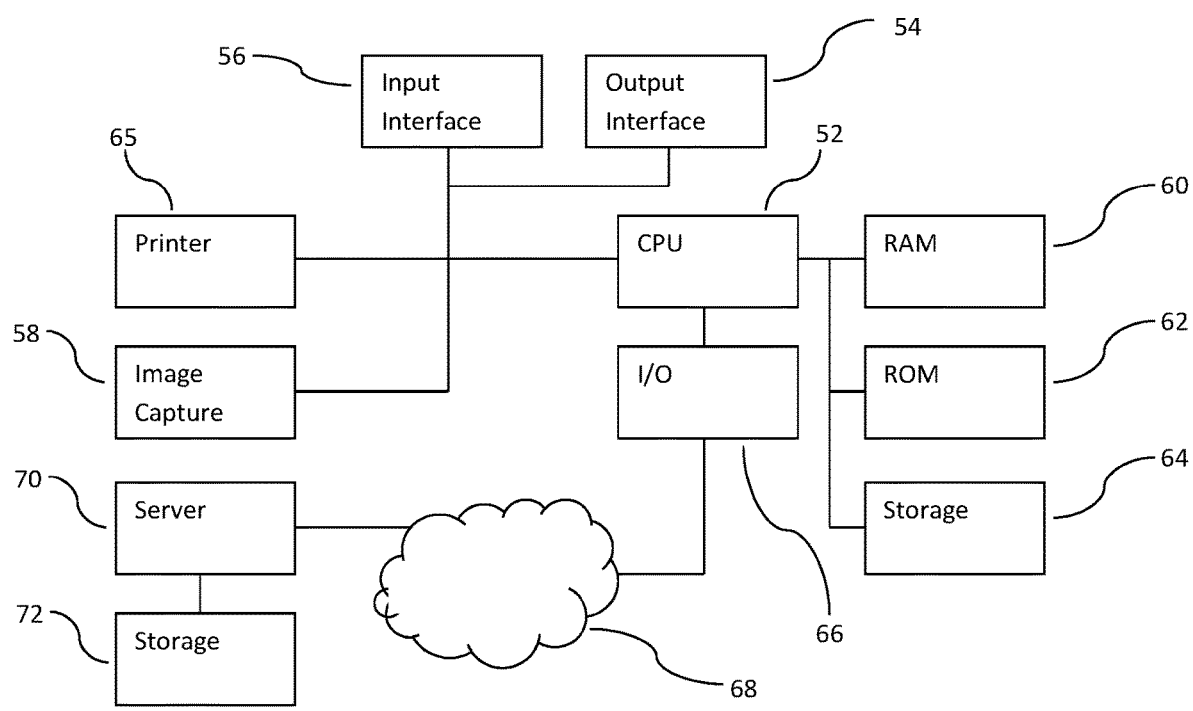
FIG. 8 is a schematic diagram of a computer system.

Referring to FIG. 8, one embodiment of a computing system indicated generally by the reference number 50 comprises, among other equipment, a processor or CPU 52, input and output devices 54, 56, including an image acquisition device 58, random access memory (RAM) 60, read-only memory (ROM) 62, and magnetic disks or other long-term storage 64 for programs and data. The computing system 50 may include a printer 65 for generating marks 20, or the printer 65 may be a separate device. The computing system 50 may be connected through an interface 66 to an external network 68 or other communications media, and through the network 68 to a server 70 with long-term storage 72. Although not shown in the interests of simplicity, several similar computer systems 20 may be connected to server 70 over network 68.

Figures 9, 11:
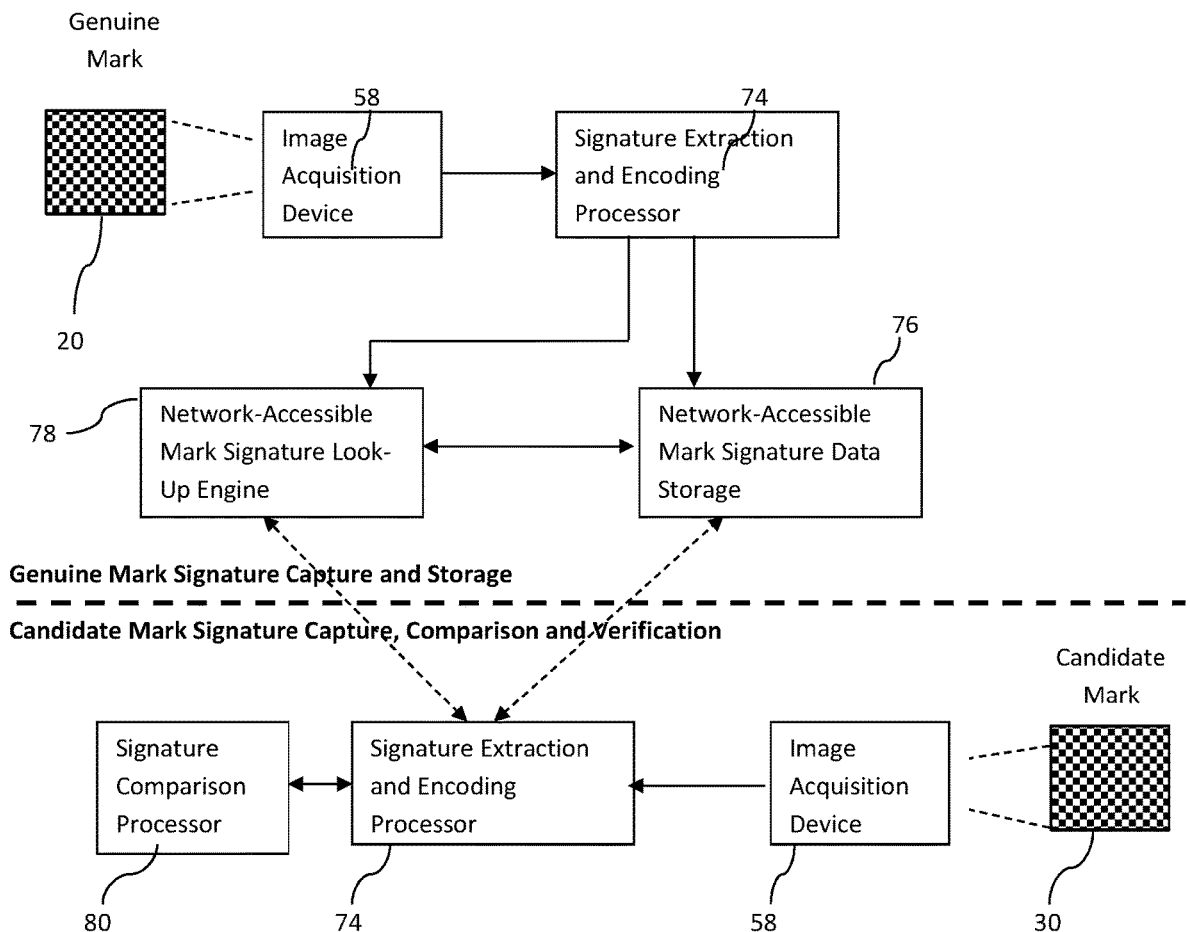
FIG. 9 is a block diagram of a computer system operative to carry out a process according to an embodiment.
FIG. 11 is a diagram of the weighting of characteristic features.

Referring to FIG. 9, in one embodiment of a computing system, the image acquisition device supplies image data to a signature extraction and encoding processor 74, which may be software running on the primary CPU 52 of computer system 50, or may be a dedicated co-processor. Signature extraction and encoding processor 74 supplies signature data to network-accessible mark signature data storage 76, which may be long-term storage 72 of server 70. Network-accessible mark signature look-up engine 78, which may be software running on the primary CPU 52 of computer system 50, or may be a dedicated co-processor, receives signature data from signature extraction and encoding processor 74 and/or signature data storage 76. Signature comparison processor 80 usually compares a signature extracted by signature extraction and encoding processor 74 from a recently scanned mark 30 with a signature previously stored in signature data storage 76 and associated with a genuine mark 20. As shown symbolically by the separation between the upper part of FIG. 9, relating to genuine mark signature capture and storage, and the lower part of FIG. 9, relating to candidate mark signature capture, comparison, and verification, the computer system 50 that scans the candidate mark 30 may be different from the computer system 50 that scanned the original mark 20. If they are different, then usually either they share access to the signature data storage 76, or a copy of the stored signature data is passed from storage 76 on genuine mark capture system 50 to candidate mark evaluation system 50.

Figure 10:
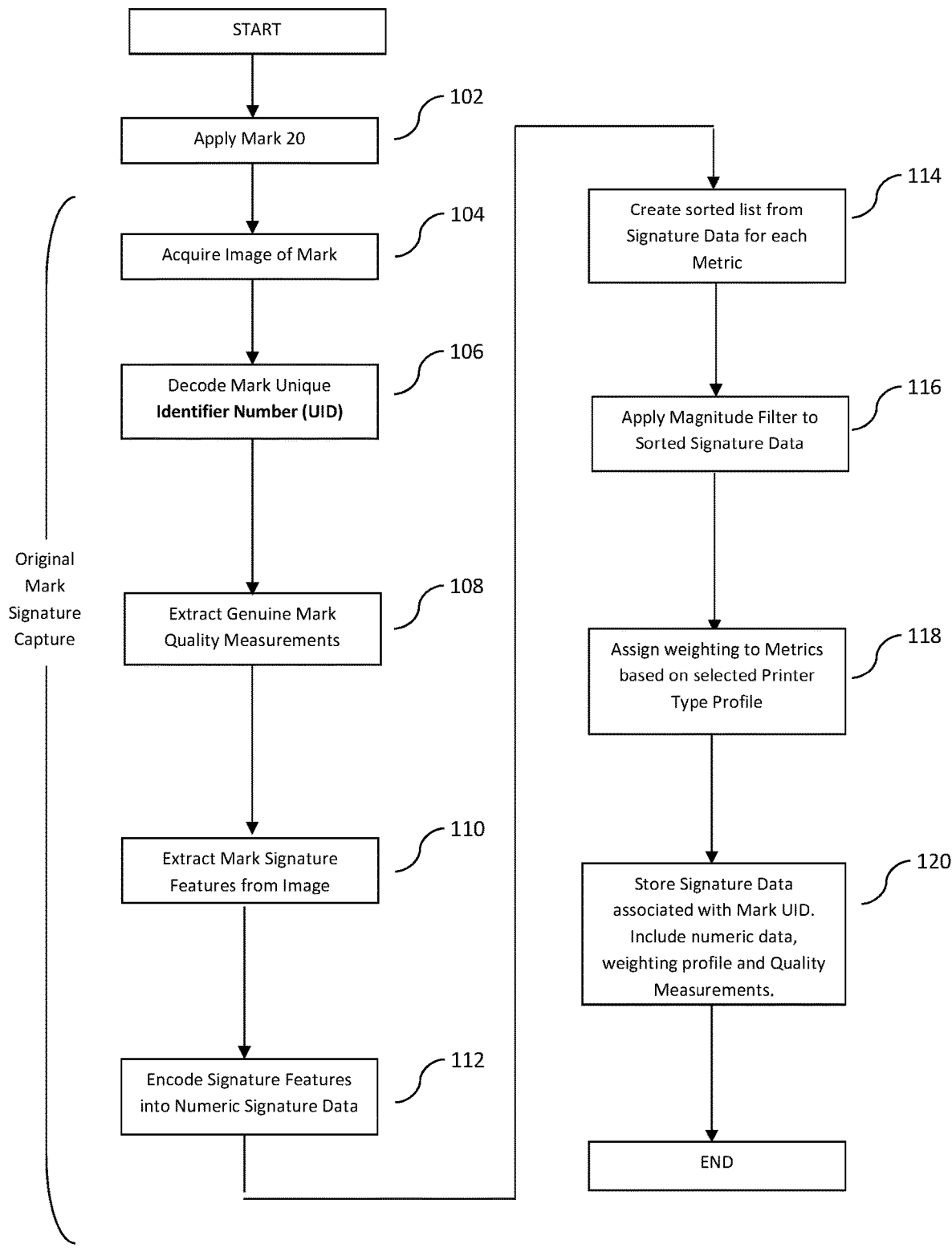
FIG. 10 is a flow chart of an embodiment of a method of recording a new mark.

In more detail, and referring to FIG. 10, in one embodiment of a method according to the invention, in step 102 a mark, which in this example is illustrated as a 2-D barcode similar to that shown in FIG. 1, is applied to an object, or to a label that is subsequently applied to an object, by printer 65. As has already been explained, a printer applying a 2-D barcode typically introduces a significant amount of artifacts that are too small to affect the readability of the overt data coded by the barcode, and are too small for their appearance to be controllable in the printing process, but are visible (possibly only under magnification) and durable. If a particular printer does not naturally produce a good supply of artifacts, some printers can be caused to include random or pseudorandom variations in their output.

In step 104, the mark is acquired by a suitable imaging or other data acquisition device 58. The imaging device may be of any expedient form, including conventional devices or devices hereafter to be developed. The only real constraint in this embodiment is that the imaging device gathers data on the appearance of the mark at a level of detail considerably finer than the controllable output of the device that applied the mark. In the example shown in FIGS. 1-4, the detail is the shape of the boundaries between light and dark areas, at a resolution considerably finer than the size of the modules of the printed 2-D barcode. Other examples of suitable features are described below. If the mark is being used as an anti-counterfeiting measure, it is strongest if the imaging device gathers data at a level of detail finer than the controllable output of a device that is likely to be used to apply or create a counterfeit mark. However, that may not be necessary if it is possible to keep secret the fact that particular details in a particular mark are being used for that purpose.

In step 106, a Unique Identifier Number (UID) included in the overt data of mark 20 is decoded. If printer 65 is on the same computer system 50 as image acquisition device 58, the UID may be passed from one to the other, avoiding the need to decode the UID from the image acquired by image acquisition device 58. If the mark 20 does not include a UID, some other information uniquely identifying the specific instance of mark 20 will usually be required at this step.

In steps 110 and 112, the image of the mark 20 is analyzed by signature extraction and encoding processor 74 to identify significant features. In step 120, data relating to those features will then be stored in signature data storage 76 as "signature" data that uniquely identifies the mark 20. This signature data is derived from the physical and optical characteristics of the mark's geometry and appearance, and in addition, can include data that is encoded in the mark, should the mark be a data-carrying symbol such as a 2-dimensional barcode. The properties of the mark evaluated for creating the signature data can include, but are not limited to, feature shape, feature contrast, edge linearity, region discontinuities, extraneous marks, printing defects, color, pigmentation, contrast variations, feature aspect ratios, feature locations, and feature size.

Where a part of the mark contains no significant features, data for that part of the mark may still be stored in the form of the information that a specified part of the mark contains no significant features. In the case of a 2-D barcode or similar symbol that is naturally divided into distinct cells or modules, a list of black modules with no significant features may be stored. For this purpose, "no significant features" may include cells with no detectable features, or cells with detectable features so small that they are prudently regarded as mere random noise, or both.

In particular, as is explained below, the photocopy detection process of the present description is usually most effective when provided with a supply of modules that, in the original mark, are known to be solid black, with no white voids and very dark grayness.

Referring now also to FIG. 5, in the following example, deviation in average module pigmentation or marking intensity 92, module position bias 94 relative to a best-fit grid, the presence or location of extraneous marks or voids 96 in the symbol, and the shape (linearity) of long continuous edges 98 in the symbol are used as exemplary variable features. These act as the primary metrics forming the unique symbol signature. Illustrations of some of these features are shown in FIG. 5.

In the case of the mark being a data-carrying symbol, such as a 2-dimensional barcode, the present embodiment can take advantage of the additional information embodied by and encoded into the symbol. The information that is encoded, for example a unique or non-unique serial number, itself may then be included as part of the signature data or used to index the signature data for easier retrieval.

Further, in the case of a 2-dimensional barcode or other data carrier for which a quality measure can be established, in step 108 information representing the quality of the symbol can optionally be extracted and included as part of the signature data.

The quality information can be used to detect changes to the mark 20 that might cause a false determination of the mark as counterfeit, as these changes can alter the signature data of the mark. Some of the quality measurements that can be used are, but are not limited to, Unused Error Correction and Fixed Pattern Damage as defined in ISO spec 15415 "Data Matrix Grading Processes" or other comparable standard. These measures make it possible to detect areas that would contribute signature data that has been altered by damage to the mark and thus discount it from consideration when comparing a mark's signature data against the stored signature data of the genuine mark.

Signature Metrics Weighting

In this example, the ease with which each of the four metrics illustrated in FIG. 5 can be extracted depends on the imaging resolution, and the metrics can be arranged in order of the resolution required to extract useful data relating to each of the four metrics, as shown in FIG. 11. In order from lowest to highest resolution, those are module pigmentation, module position bias, void/mark location, and edge shape projection. However, as will be explained in more detail below, some metrics are more useful than others for photocopy detection, and therefore a different weighting may be used at that stage.

Increasing image fidelity and resolution allows for increasingly precise analysis, making use of the progressively higher precision analytics. For example, in a low resolution image, perhaps only module average pigmentation 92 and module position bias 94 can be extracted with significant confidence, so those results are given more weight in determining the signature match of a candidate symbol against stored genuine data. With a high resolution image, processing can continue all the way up to the fine edge projection metric 98 and use that as the highest weight consideration in signature match determination. If there are disagreements among other (lower weight) measures to the expected signature, these may be due to symbol damage or artifacts of the image capture device. However, damage, alteration of the symbol 20, or imager artifacts are highly unlikely to modify a counterfeit code 30 to coincidentally match with high precision the edge projection signature metric 98 of the valid item 20. Therefore, the edge projection, if highly correlated and exhibiting adequate magnitude in dynamic range, can supersede the lower-resolution metrics in support of a high match confidence.

Further, in an embodiment, using a 2-D Data Matrix code as an example, the use of Error Correction information, as provided by the standard decoding algorithms of that symbology, is used to further weight signature metric data appropriately. If a data region within the symbol is corrupted by damage to the mark and that region yields a disagreement with stored signature data while other uncorrupt regions agree well, the voting weight of the corrupted region shall be diminished. This mechanism prevents detectable symbol corruptions from presenting a false-negative result in a candidate symbol metric comparison against the genuine symbol signature data. The ISO 16022 "Data Matrix Symbol" specification describes an example of how Error Correction Codes (ECC) can be distributed within a 2-D Data Matrix, and how corrupted and uncorrupted regions within a Data Matrix can be identified.

Magnitude Filtering

As will be explained in more detail below, in the present embodiment two different ranges of magnitudes are selected. The first range may consist of a predetermined number of the highest-magnitude artifacts that are present. The second range may consist of a predetermined number of the lowest-magnitude artifacts that can reliably be detected, or of a predetermined number of artifacts in a range immediately below the first range, or in a range lower than but overlapping with, the first range. The second range may consist, in whole or in part, of locations with no detectable artifact large enough to be reliably distinguished from random noise. Sufficient features are selected and evaluated to populate both ranges.

In steps 114 and 116, candidate signature features for the first range are evaluated to ensure they possess adequate magnitude to act as a part of each signature metric. This step ensures that the features forming each signature metric possess a real "signal" to encode as a distinguishing characteristic of the mark. Failure to apply threshold minima to signature contributor candidates can allow a signature that is easily subsumed by noise in any subsequent attempts to validate a mark against the genuine stored signature, rendering the validation process highly susceptible to the quality and fidelity limitations of the device(s) used to capture the mark data for signature analysis. By ensuring that signature metrics are formed solely of features satisfying these magnitude threshold minima, the ability to perform successful verification of mark signatures with a wide variety of acquisition devices (camera equipped cell phones, machine vision cameras, low quality or low resolution imagers, etc.) and in a wide range of ambient environments (varied, low or non-uniform lighting, etc.) can be ensured or greatly facilitated.

In an embodiment, using a 2-D Data Matrix code as an example, in steps 110, 112, and 114 candidate features for the four signature metrics 92, 94, 96, 98 are extracted and sorted by magnitude. As previously described, the mark 20 is acquired such that the features can be processed in electronic form, typically as a color or gray-scale image. As a preliminary step, the 2-D Data Matrix is first analyzed as a whole, and a "best fit" grid defining the "ideal" positions of the boundaries between cells of the matrix is determined. Candidate features are then selected by finding features that are most deviant from the "normal" or "optimum" state of the marks attribute(s) for the particular metric being analyzed. Considering the 2-D Data Matrix code example shown in FIG. 5, some suitable attributes are:

1. Modules 92 whose average color, pigmentation or mark intensity are closest to the global average threshold differentiating dark modules from light modules as determined by the Data Matrix reading algorithms, i.e., the "lightest" dark modules and the "darkest" light modules. In a photocopy, as was illustrated by FIGS. 5 and 7, at low resolutions a significant proportion of dark modules may present a lighter average color than in the original mark.

2. Modules 94 that are marked in a position that is most deviant from the idealized location as defined by a best-fit grid applied to the overall symbol 20. Two methods of identifying these modules are: (a) extract the candidate mark module edge positions and compare those edge positions to their expected positions as defined by an idealized, best-fit grid for the whole symbol 20; (b) extract a histogram of the boundary region between two adjacent modules of opposite polarity (light/dark or dark/light), with the sample region overlapping the same percentage of each module relative to the best-fit grid, and evaluate the deviation of the histogram from a 50/50 bimodal distribution.

3. Extraneous marks or voids 96 in the symbol modules, be they either light or dark, are defined as modules possessing a wide range of luminance or pigment density; i.e., a module possessing pigmentation levels on both sides of the global average threshold differentiating dark modules from light modules, with the best signature candidates being those with bimodal luminance histograms having the greatest distance between the outermost dominant modes. In a photocopy, as was illustrated by FIGS. 5 and 7, at high resolutions a significant proportion of dark modules may present white voids that were not present in the original mark.

4. The shape of long continuous edges 98 in the symbol, measuring either their continuity/linearity or degree of discontinuity/non-linearity. One method of extracting this data is a pixel-wide luminance value projection, with a projection length of one module, offset from the best fit grid by one-half module, run perpendicular to the grid line bounding that edge in the best-fit grid for the symbol. Photocopying typically affects the edge shape metric in a similar way to counterfeiting. However, the magnitude of the change to the edge shape metric from photocopying is typically not sufficient for reliable detection. In experiments, only about 50% of photocopies were rejected as apparently counterfeit because of changes to the edge-shape metric.

5. The Moment of Inertia (MI) of a Gray Level Co-occurrence Matrix (GLCM) of modules 92. This measure is very sensitive to speckling of the module, which is useful for photocopy detection.

The 2-D Data Matrix makes a good example, because it consists of square black and white cells, in which the above described features are easily seen. However, the same principles can of course be applied to other forms of data-encoding or non-data-encoding visible mark.

Once candidate features complying with the above-described criteria have been identified, the candidate features are sorted in step 114 into a list in order of magnitude. To define the first range, the candidate features may then be subjected in step 116 to magnitude limit filtering by finding the first feature in each list that does not satisfy the established minimum magnitude to qualify as a contributor to that metric. The threshold may be set at any convenient level low enough to include a reasonable number of features that cannot easily be reproduced, and high enough to exclude features that are not reasonably durable, or are near the noise-floor of the image acquisition device 58.

The lower threshold for the second range may be set to include features that are too close to the noise threshold to be satisfactory individually for the first range, but are still capable of meaningful analysis at a statistical level. In this embodiment, the low-magnitude end of the sorted list is then truncated from the threshold point and the remaining (highest magnitude) features are stored, along with their locations in the mark, as the signature data for that metric. Preferably, all features above the truncation threshold are stored, and that implicitly includes in the signature the information that there are no signature features above the magnitude filter threshold elsewhere in the mark. Where the first and second ranges are contiguous or overlap, they may be stored as a single list. That avoids duplicating the features in the overlap region.

In an embodiment, a complete set of possible features is used, for example, where the mark is a 2-D barcode and the metric is the grayness of a nominally black module, all the nominally black modules of the barcode may be used. The first range may then consist of a predetermined number of the palest black modules, and the second range may then consist of a predetermined number of the darkest black modules. It cannot be guaranteed that any of the black modules is perfectly black, but experiments show that it would be exceptional for a thermal transfer printer in good condition not to produce a sufficient number of sufficiently black modules for the purposes of the present process.

Some metrics may be of little value for photocopy detection, for example, as is illustrated by FIG. 7, speckling is much less pronounced in nominally white modules than in nominally black modules. Second range data for those metrics may therefore not be used. However, it may be preferred to store the full data set for all metrics, both in the interests of simplicity, and to allow those data to be re-analyzed if the analytical algorithms are subsequently improved.

As it is known beforehand that different marking device technologies present superior or inferior signature features in different attributes for use in creating Metrics signature data, the marking device type may be used to pre-weight the metrics in what is referred to as a Weighting Profile. For example, if the genuine marks are created using a thermal transfer printer, it is known that edge projections parallel to the substrate material direction of motion are unlikely to carry a signature magnitude sufficient to encode as part of the genuine signature data. However, a photocopy of the genuine mark will likely show photocopy artifacts along those edge projections, and the absence of artifacts in the genuine mark can make the photocopy artifacts more conspicuous, and easier to assess. This knowledge of various marking device behaviors may be used during the capture of the original genuine signature data. If employed, all metrics used in the creation of the genuine mark signature are weighted as appropriate for the known behaviors of that particular marking device type, and the resulting emphasis/de-emphasis mapping of the metrics becomes a Metrics Weighting Profile. In step 118, this profile of the metrics weighting, based on the marking device type used to create the original mark, is stored as part of the signature data.

In step 120, the signature metrics are stored as sorted lists of features, in descending order of magnitude. At the lower end of the list, the order may be largely arbitrary, because it will be primarily noise. However, in this embodiment an order is needed because it will be used at a later step to match candidate features against original features. The list entry for each feature includes information localizing the position in the mark from which that feature was extracted.

In this embodiment, the record for each symbol is indexed under a unique identifier content (typically a serial number) included in the explicitly encoded data in the symbol. The record may be stored on a network accessible data storage server or device, or may be stored locally where it will be needed. Copies may be distributed to local storage at multiple locations.

Low Amplitude Signature Metrics

If the instance of a symbol 20, or an identifiable region within the symbol, lacks any signature feature satisfying the minimum magnitude for the first range for one or more of the signature metrics, in an embodiment that fact itself is stored as part of the signature data, thereby utilizing the lack of significant feature variation as part of the unique identifying information for that symbol. In this case, a symbol subjected to verification against that data is considered genuine only if it also possesses zero signature features satisfying the minimum magnitude for the metric(s) in question, or at least sufficiently few significant features to pass a statistical test. In these cases, the weighting for that particular metric is diminished, as a region with no distinguishing characteristics is a less robust identifying feature than would be a region with significant distinguishing characteristics. A symbol or region with no significant signature feature is most useful negatively. The absence of significant features from both the genuine mark 20 and the candidate mark 30 is only weak evidence that the candidate mark is genuine. The presence of a significant feature in a candidate mark 30, where the genuine mark 20 has no matching significant feature, is stronger evidence that the candidate mark is counterfeit.

An exception is made for features of appreciable signature magnitude that can be attributed to symbol damage in the candidate symbol 30, revealed via the aforementioned use of symbol Error Correction information from the decoding algorithms of that particular symbology, and subject to the principles of captured image fidelity signature metrics weighting as previously described.

In the extreme case where both the genuine mark 20 and the candidate mark 30 contain ONLY sub-threshold data (as in 2 "perfect" symbols), they would be indistinguishable by the process of the present example because that process relies on some measurable variation in either the genuine or counterfeit mark to act as a way of detection. That is not a problem in practice, as none of the usage scenarios presently contemplated (typically, on-line, high speed printing) produce perfect symbols. In particular, a photocopy of a "perfect" symbol will typically result in a symbol that appears to be perfect for artifacts in the first range, but displays low-magnitude photocopy artifacts in the second range.

Analysis

Figure 12:
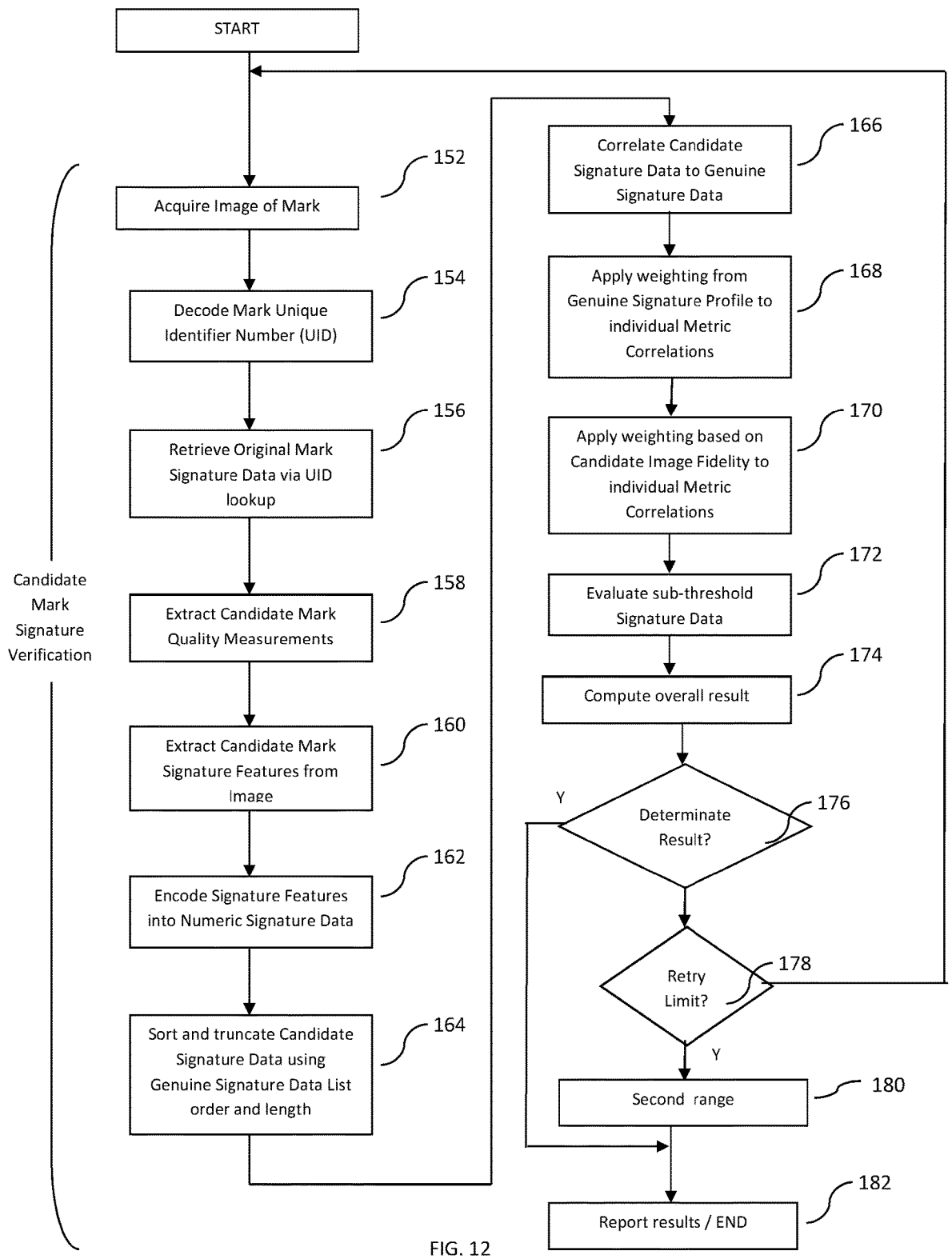
FIG. 12 is a flow chart of an embodiment of a method of evaluating a mark.

Referring to FIG. 12, in an embodiment, signature metrics are stored as a sorted list, in descending order of magnitude, and include information localizing their position in the mark from which they were extracted. In an embodiment, using a 2-D Data Matrix code as an example, the process by which a candidate mark or symbol is evaluated to determine if it is genuine is as follows:

In step 152, an image of the candidate mark 30 is acquired by the image acquisition device 58.

In step 154, the explicit data in candidate mark 30 is decoded and its unique identifier (UID) content is extracted.

In step 156, the UID is used to look up the signature metric data originally stored for the original symbol 20 having that UID. The stored data may be retrieved from local storage 64 or may be retrieved from a network accessible data storage server or device 72. In the case of a candidate mark 30 that does not contain a UID, some other identifying information may be obtained relating to the candidate mark 30. Alternatively, the entire database of genuine mark signatures on storage 64 or 72 may be searched after step 164 below, to attempt to locate a genuine signature that matches candidate mark signature.

In step 158, in the case of a 2-dimensional barcode or other data carrier for which a quality measure can be established, quality measurements for the candidate mark 30 may be obtained, similarly to those obtained in step 108 for the genuine mark 20. The quality measurements may be used in the subsequent analysis steps to reduce the weight given to a mark, or parts of a mark, that appear to have been damaged since it was applied. Also, if the quality measurements of the original symbol 20 were stored as part of the genuine signature data, the stored quality measurements can be verified against the signature data extracted from the candidate mark 30.

In step 160, significant signature features are extracted from the image of candidate mark 30 that was acquired in step 152. The whole of candidate mark 30 (other than sections that have been disqualified as corrupt by Error Correction) is searched for significant features. In addition, the information specifying the locations within the symbol from which the original, genuine symbol signature data was extracted is used to specify from where to extract the signature data from the candidate symbol. That ensures that a feature present in mark 20 but absent from mark 30 is noted. The extracted features are for both the first and second ranges.

In step 162, the signature features are encoded for analysis.

In step 164, the signature data for the at least the first (high-magnitude) range extracted from the candidate symbol 30 is sorted into the same order as the original list of the original symbol 20. For the first range, the original and candidate artifacts may be independently sorted in order of magnitude. For the second range, in this embodiment the original and candidate artifacts are sorted into the same order by reference to the stored location data for the original artifacts. That enables each module of the candidate mark to be compared with the module in the same location of the original mark.

In step 166, the candidate signature data for the first range is compared to the stored original signature data for the first range. The data is subjected to a statistical operation revealing numeric correlation between the two data sets. Each metric is subjected to individual numerical analysis yielding a measure reflecting the individual confidence of the candidate symbol as being the genuine item for that metric. If the mark does not contain UID data, and no alternative identifying data is available, it may be necessary to search through a database of similar marks, using the procedures discussed with reference to FIG. 16 below. For example, in the case of FIGS. 1 and 3, it may be necessary to search through all genuine marks 20 that have the same overt pattern of black and white modules. The objective of the search is to identify, or fail to identify, a single genuine mark 20 that is uniquely similar to the candidate mark 30.

In step 168, where the Metrics Weighting Profile was stored as part of the genuine signature data, this information is used to emphasize and/or de-emphasize metrics as appropriate for the type of marking device used to create the original genuine marks.

In step 172, by exclusion, all locations within a mark not represented in the sorted list of feature locations satisfying the minimum magnitude threshold for the first range are expected to be devoid of significant signature features when analyzing a genuine mark. This condition is evaluated by examining the signature feature magnitude at all locations within a candidate mark where sub-threshold features are expected, and adjusting the results for the appropriate metric toward the negative when features exceeding the threshold minimum are found. If the significant features are found in a region determined to have been damaged when evaluated for symbol error correction or other quality attributes, the adjustment is diminished or not carried out at all, depending on the location of the damage relative to the feature extraction point and the nature of the particular metric involved. For example, if a discrepancy in a signature feature relative to the original mark 20 is extracted from a module of the candidate mark 30 that is near, but not the same as, the damaged module(s), the negative adjustment to the metric because of that feature may be diminished by a proportion that reflects reduced confidence in the metric signature, because the former module, being near a known damaged region, may well have suffered damage that affects the metric but falls below the detectable threshold of the quality or ECC evaluation mechanism of the symbology. If the discrepancy is extracted directly from a damaged module, or if the metric is one of the types that spans multiple modules and that span includes the damaged one, the adjustment will not be applied at all.

In step 174, these individual confidence values are then used to determine an overall confidence in the candidate symbol 30 as genuine (or counterfeit), with the individual confidence values being weighted appropriately as described above using image fidelity, resolution and symbol damage information.

In step 176, it is determined whether the result is sufficiently definite to be acceptable. If the comparison of the signature data yields an indeterminate result (for example, the individual metrics having contradictory indications not resolvable through the use of the data weighting mechanism), the user submitting the symbol for verification is prompted to re-submit another image of the symbol for processing, and the process returns to step 152.

For practical reasons, the number of permitted retries is limited. In step 178, it is determined whether the retry limit has been exceeded. If so, a further return for rescanning is prevented.

If the result from step 176 is indeterminate, then in step 180 the data in the second (lower magnitude) range for both the original mark and the candidate mark may be retrieved and compared by a process similar to steps 166 to 178. Alternatively, step 180 may also be carried out for marks that are identified in step 176 as genuine. Alternatively, the comparison for the second range may be carried out in steps 166 to 178 in parallel with the comparison for the first range. That may save time, although if in a high proportion of cases the second range result is not needed, it may be less efficient. However, where the comparison for the first range is largely directed to matching individual artifacts, the comparison for the second range is statistical, and is largely directed to measuring the degree of uniformity of the artifacts.

In step 182, the results are reported and the process ends.

Figure 13:
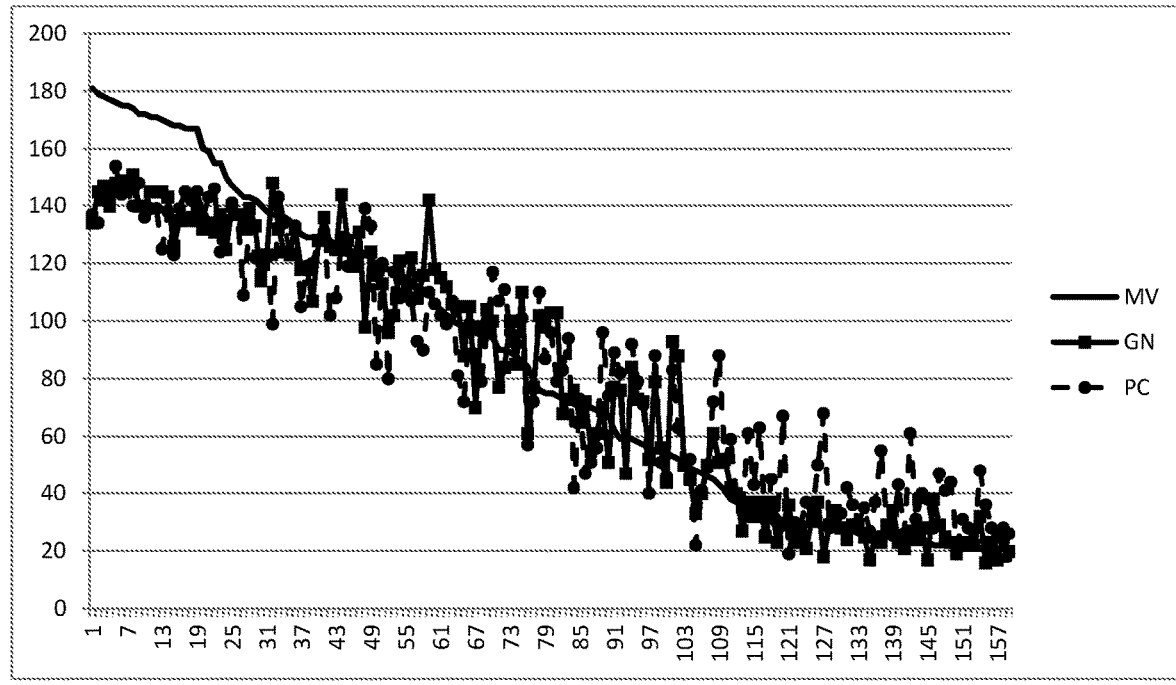
FIG. 13 is a comparative graph of artifact magnitudes.

Referring to FIG. 13, there is shown a graph of the magnitude of a set of artifacts. The artifacts are sorted along the X-axis into descending order of magnitude, up the Y-axis, in the original signature of the genuine item, as stored in step 120 and retrieved in step 156. For accuracy of the second-range comparison, the same locations on the mark are used at step 110 and at step 160, even if some of those locations appear to show no meaningful artifact at either step. Also plotted are the corresponding magnitudes, as they might be acquired at step 152, for a genuine mark and for a photocopy mark. As may be seen from FIG. 13, even the genuine mark, as scanned at step 152, shows significant random variation from the original stored data, because of deterioration of the mark over time, and because a scanner of lower quality, for example, the camera on a smartphone, was used at step 152 than at step 104. However, the photocopy mark shows much larger random variation towards the right-hand side of FIG. 13, where the mark as originally scanned in step 104 has low magnitude artifacts. Thus, by comparing the variation in magnitude in two ranges, one to the left in FIG. 13 and one to the right in FIG. 13, the photocopy can be recognized with a surprisingly high degree of accuracy and confidence, even without attempting to assess the absolute values of the artifact magnitudes.

Any convenient statistical measure of non-uniformity, such as standard deviation, or error sum, may be used. The first and second ranges may be chosen empirically for a particular genuine mark, and particular artifact metrics. For marks similar to the one used to generate the data set shown in FIG. 13, satisfactory results were obtained using data points 1 to 100 for the first range, and 61 to 160 for the second range. The set of 160 data points represented all the nominally black modules in the data matrix used for the experiment. However, as may be seen from FIG. 13, the difference between the verification scans for the genuine and photocopied candidate marks is strongest for data points from approximately 110 to 160, which are shown in more detail in FIG. 14.

Thus, if the uniformity of the artifacts in the candidate mark in the second range is lower than the uniformity of artifacts in the original mark in the second range, and the difference is disproportionate to the corresponding difference for the first range, that may indicate that the candidate mark is a photocopy. The result from this test may be used to adjust the result from step 178. Because this additional test is available, some results that might otherwise have been classified as genuine or counterfeit, but are close to the borderline, may be treated as indeterminate at step 178 and reconsidered in view of the photocopy test at step 180. A result indicating that the candidate mark is not a photocopy is usually not persuasive, because there are many other ways of copying a mark. However, a result indicating that the candidate mark is a photocopy may justify downgrading the candidate mark from "genuine" to "indeterminate," especially if the "genuine" grade was borderline, or from "indeterminate" to "counterfeit."

Once the analysis has been completed successfully, the results of the comparison analysis are reported in step 182. The report may be pass/fail, or may indicate the level of confidence in the result. These results may be displayed locally or transferred to a networked computer system or other device for further action. If the result is still indeterminate when the retry limit is reached, that also proceeds to step 182, where the indeterminate result may be reported as such.

Upon the storing of the signature data extracted from the mark 20 shown in FIG. 1, the present method is capable of recognizing that same mark as genuine when presented as a candidate mark 30 by virtue of the fact that, when analyzed by the same process, it is determined to possess the same signature data, at least to a desired level of statistical confidence. Similarly, the present method is capable of identifying a counterfeit copy 30 of the mark 20 shown in FIG. 1, or distinguishing a different unique instance 30 of the mark, by recognizing that the signature data, for example as extracted from the instance of the mark in FIG. 3, does not match that originally stored from when the genuine mark shown in FIG. 1 was originally processed.

Instead of, or in addition to, using the photocopy detection result from step 180 to assist in determining whether the candidate mark 30 is genuine, the result may be used for diagnostic or investigative purposes. For example, it may be helpful to know that a counterfeiter is persistently photocopying genuine marks 20, and identifying the volume and geographical extent of the counterfeiter's activities may assist in identifying the counterfeiter. Because photocopying machines are not identical, in some cases the characteristics of the artifacts in photocopied marks may be sufficiently distinctive to identify different counterfeiters.

Local Reference Measurements for Metric Data for Environmental Immunity

To further make robust the extraction of accurate signature data, wherever possible the methods of this invention utilize area-local referencing within the analyzed symbol for composing the signature data. This provides greater immunity to things like the aforementioned substrate distortion, non-uniform lighting of the candidate symbol when acquired for processing, non-ideal or low quality optics in the acquiring device, or many other environmental or systematic variables. For an embodiment, the metric reference localizations are:

1. Average module color, pigmentation or mark intensity reference the nearest neighbor(s) of the opposite module state (dark vs. light or light vs. dark). Where a cell is identified as a significant feature 92 with deviant average pigmentation density, the cells for which it was a nearest neighbor may need to be reassessed discounting the identified deviant cell as a reference.

2. Module grid position bias is referenced to the overall symbol best fit grid, and as such has native adaptive reference localization.

3. The analysis of extraneous marks or voids in the symbol modules utilize module-local color, pigmentation or mark intensity references—i.e. the image luminance histogram within the analyzed module itself provides reference values for the applied methods.

4. The projection methods used to extract the shapes of long continuous edges in the symbol are differential in nature and have native immunity to typical impacting variables.

Figure 15:
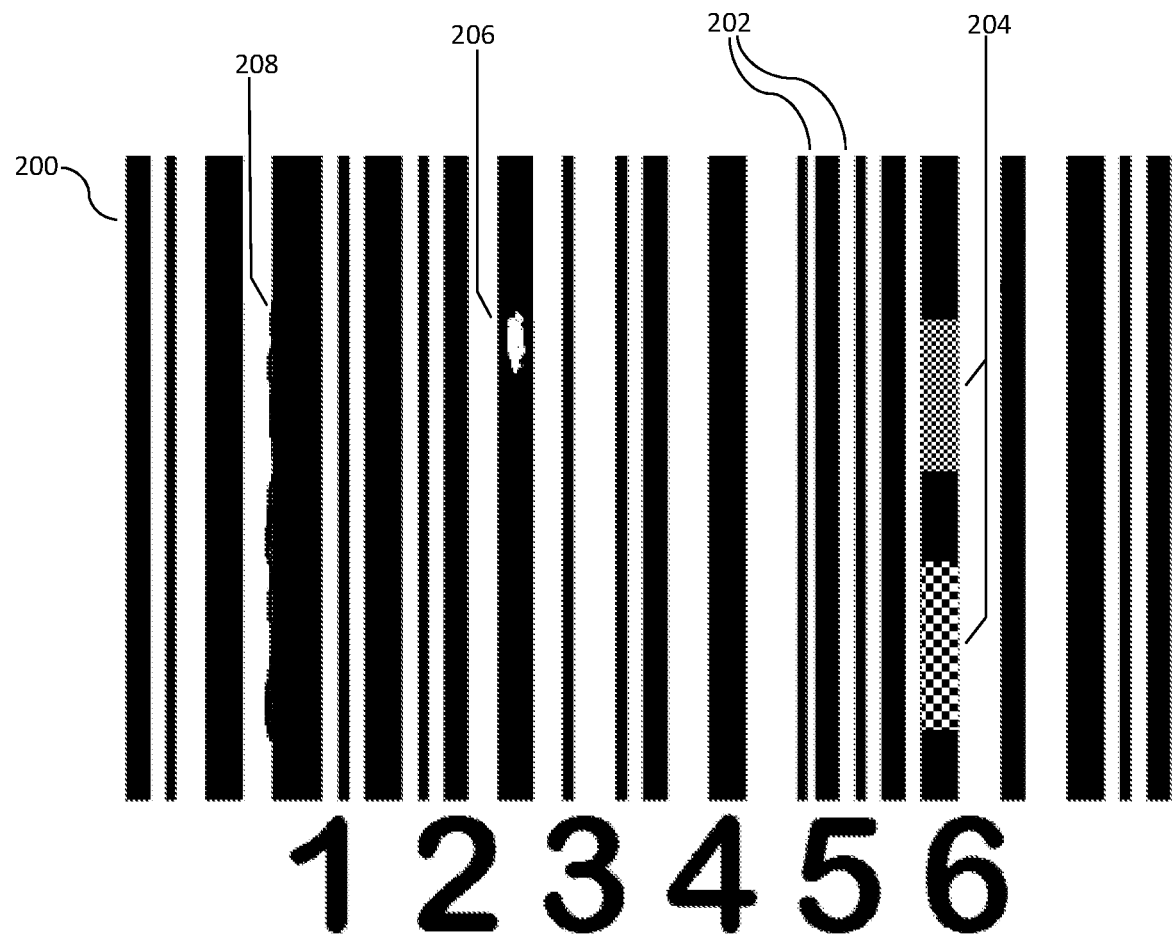
FIG. 15 is a 1-D barcode illustrating some features that may be used in an embodiment.

Referring now to FIG. 15, an alternative embodiment is similar to the process described with reference to FIG. 5, but may use types of mark other than the 2-D symbol. For instance, the symbol may be a 1-D linear barcode, a company logo, etc. FIG. 15 shows some features of a 1-D linear barcode 200 that may be used as signature metrics. These include: variations in the width of and/or spacing between bars 202; variations in the average color, pigmentation or intensity 204; voids in black bars 206 (or black spots in white stripes); or irregularities in the shape of the edges of the bars 208. If solid black areas are required for photocopy detection, they may be taken from parts of the broader black stripes that do not show artifacts 204 or 206.

Analysis by the Autocorrelation Method

In the embodiments described above, the raw list of data for each metric is first array-index matched and subjected to normalized correlation to a like-order extracted metric set from a candidate symbol. These correlation results are then used to arrive at a match/no match decision (genuine vs. counterfeit). To do that, storage of the signature necessarily includes the sorting order of the original genuine symbol modules as well as the trained metrics values themselves, complete for each metric. In addition to the exhaustive storage need, the raw data is not "normalized," because each metric has its own scale, sometimes unbounded, which complicates the selection of storage bit-depths. A typical implementation of the above-described embodiments has a stored signature size of approximately 2 kilobytes.

Referring now to FIGS. 16 to 20, an alternative embodiment of metrics post-processing, storage and comparison methods is applied after the original artifact metrics have been extracted and made available as an index-array associated list (associable by module position in the symbol). Based on autocorrelation, the application of this new post-processing method can in at least some circumstances yield several significant benefits when compared to the signatures of the previous embodiments. In U.S. Patent Application Publication 2013/0228619, it was explained that by generating the autocorrelation function at step 120 and storing only the autocorrelation data, a significant reduction in data package size could be achieved. In the methods now described, that reduction may not necessarily be obtained, because the location and sort order are stored at least for the second range data items. However, autocorrelation still provides a robust and effective way of comparing the original and candidate datasets.

Where in the embodiments described above the analysis of a particular set of metrics data takes the form of comparing the sorted raw metrics extracted from a candidate symbol to the like-ordered raw metrics extracted from the genuine symbol, the autocorrelation method compares the autocorrelation series of the sorted candidate symbol metrics data to the autocorrelation series of the (stored) sorted genuine symbol data—effectively the autocorrelations are now correlated. The autocorrelation series are generated separately for the first and second ranges, and the results of correlating the two pairs of autocorrelations are compared.

For the first range data, a valid autocorrelation may be possible merely by sorting each of the original and candidate datasets separately into descending order of magnitude of the artifacts. That is possible because a genuine candidate mark will have artifacts very similar to those of the original mark. However, for the second range, the correlation between the original and genuine candidate data is usually too low. The original sort order is therefore stored in step 120, and the same order is used for sorting the candidate data in step 164, at least for the second range data. It is then usually most effective to use the stored sort order for the first range data as well.

For clarity, the well-known statistical operation $$r_{xy} = \frac{n\sum x_i y_i - \sum x_i \sum y_i}{\sqrt{n\sum x_i^2 - (\sum x_i)^2} \sqrt{n\sum y_i^2 - (\sum y_i)^2}}$$

is the common Normalized Correlation Equation, where: r is the correlation result, n is the length of the metric data list, and x and y are the Genuine and Candidate metrics data sets.

When the operation is implemented as an autocorrelation, both data sets x and y are the same.

To produce the autocorrelation series, the correlation is performed multiple times, each time offsetting the series x by one additional index position relative to the series y (remembering that y is a copy of x). As the offset progresses the data set "wraps" back to the beginning as the last index in the y data series is exceeded due to the x index offset; this is often accomplished most practically by doubling the y data and "sliding" the x data from offset 0 through offset n to generate the autocorrelation series.

In implementing the autocorrelation approach, it is not necessary to include the signature data values themselves as part of the final data. In autocorrelation, a data series is simply correlated against itself. So, where previously it was necessary to deliver both the extraction (sort) order and genuine signature data values to the verification device for validation, now it is needed only provide the sort/extraction order for the autocorrelation series operation. However, because the sort order and magnitude data are stored at least for the low-magnitude end of the range, it has been found that in some embodiments it is most compact to store the actual signature data values, and generate the original autocorrelation curve only when it is needed at step 166.

In an embodiment, $r_{xy}$ is computed, where each term $x_i$ is an artifact represented by its magnitude and location, and each term $y_i = x_{(i+j)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n-j are interchangeable. Therefore, the autocorrelation series always forms the U-shaped curve shown in FIG. 16, which is necessarily symmetric about j=0 and j=n/2. It is therefore in fact necessary to compute only half of the curve, although in FIG. 16 the whole curve from j=0 to j=n is shown for clarity.

In an embodiment, the raw metrics data is extracted from the candidate symbol, and is sorted in the same sort order as the original metrics data, which may be indicated as part of the original signature data if it is not predetermined.

The candidate metrics data is then autocorrelated for each of the first and second ranges. The resultant candidate autocorrelation series may then be correlated against the original autocorrelation curves for that metric, or alternatively the two pairs of curves may be compared by computing a curve-fit error between the curves of each pair. This correlation is illustrated graphically in FIGS. 17 and 20. This final correlation score then becomes the individual "match" score for that particular metric. Once completed for all metrics, the "match" scores are used to make the genuine/counterfeit decision for the candidate symbol.

Additionally, use can further be made of the autocorrelation curves by applying power-series analysis to the data via discrete Fourier transform (DFT). For clarity, the well-known operation $$X_k = \sum_{n=0}^{N-1} x_n \cdot e^{-i2\pi k n/N}$$

is the Discrete Fourier Transform, where: $X_k$ is the $k^{th}$ frequency component, N is the length of the metric data list, and x is the metrics data set.

The Power Series of the DFT data is then calculated. Each frequency component, represented by a complex number in the DFT series, is then analyzed for magnitude, with the phase component discarded. The resulting data describes the distribution of the metric data spectral energy, from low to high frequency, and it becomes the basis for further analysis. Examples of these power series are shown graphically in FIGS. 17, 18, and 20.

Two frequency-domain analytics are employed: Kurtosis and a measure of energy distribution around the center band frequency of the total spectrum, referred to as Distribution Bias. Kurtosis is a common statistical operation used for measuring the "peakedness" of a distribution, useful here for signaling the presence of tightly grouped frequencies with limited band spread in the power series data. The present example employs a modified Kurtosis function, defined by $$\text{kurtosis} = \frac{\sum_{n=1}^{N}(Y_n - \overline{Y})^4}{N(N-1)s^4}$$

where: $\overline{Y}$ is the mean of the power series magnitude data, s is the standard deviation of the magnitudes, and N is the number of analyzed discrete spectral frequencies.

Distribution Bias is calculated as $$DB = \frac{\sum_{n=0}^{(N/2)-1} x_n - \sum_{n=N/2}^{N} x_n}{\sum_{n=0}^{N} x_n}$$

where N is the number of analyzed discrete spectral frequencies.

The smooth polynomial curve of the genuine symbol metric signatures (arising from the by-magnitude sorting) yields recognizable characteristics in the spectral signature when analyzed in the frequency domain. A candidate symbol, when the metrics data are extracted in the same order as prescribed by the genuine signature data, will present a similar spectral energy distribution if the symbol is genuine; i.e. the genuine sort order "agrees" with the candidate's metric magnitudes. Disagreement in the sorted magnitudes, or other superimposed signals (such as photocopying artifacts), tend show up as high-frequency components that are otherwise absent in the genuine symbol spectra, thus providing an additional measure of symbol authenticity. However, without the additional analysis described in the present specification, the high-frequency component in the first-range candidate data is not sufficiently distinctive to be a reliable indicator of a photocopy. This addresses the possibility that a counterfeit autocorrelation series might still satisfy the minimum statistical match threshold of the genuine symbol. This is a remote possibility, but can conceivably happen when using normalized correlation if the overall range of the data is large compared to the magnitude of the errors between individual data points, and the natural sort order of the dominant metric magnitudes happens to be close to that of the genuine symbol. The distribution characteristics of the DFT power series of such a signal will reveal the poor quality of the match via the high frequencies present in the small amplitude match errors of the candidate series. Such a condition could be indicative of a photocopy of a genuine symbol. In specific terms, here a high Kurtosis and a high Distribution Ratio are expected in the spectra of a genuine symbol.

Along with the autocorrelation match score, this power series distribution information is used as a measure of "confidence" in the verification of a candidate symbol.

Figure 16:
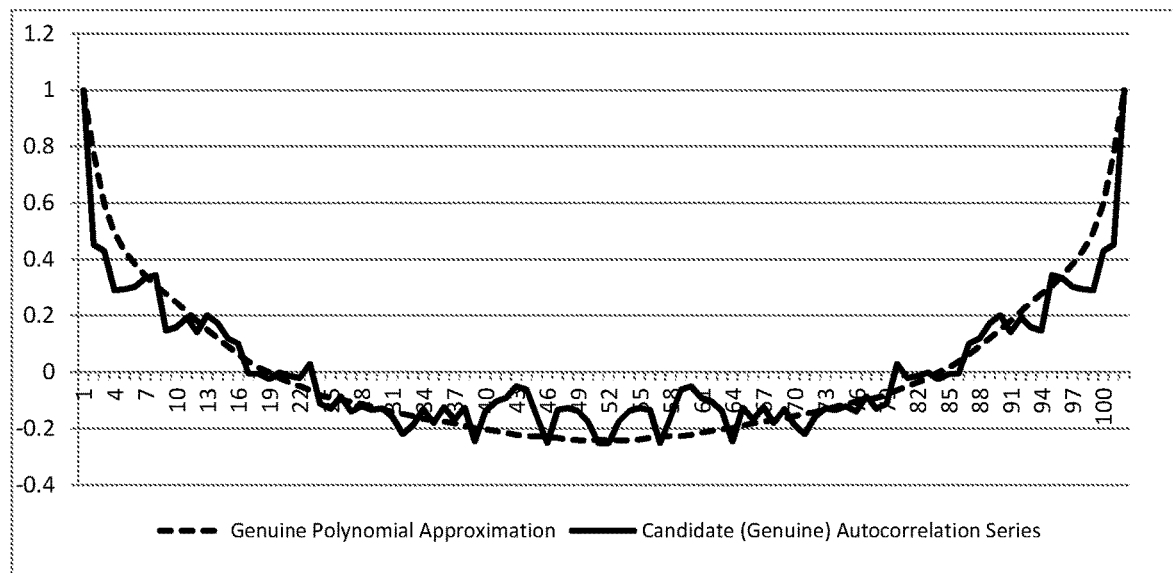
FIG. 16 is a graph of a polynomial approximation of an autocorrelation series for a genuine item with a genuine "candidate" symbol.

FIG. 16 shows a comparison of the autocorrelation series for a single metric between a genuine item (polynomial approximation) and a candidate symbol (genuine in this case). Note the close agreement; here the correlation between the 2 autocorrelation series exceeds 93%.

Figure 17:
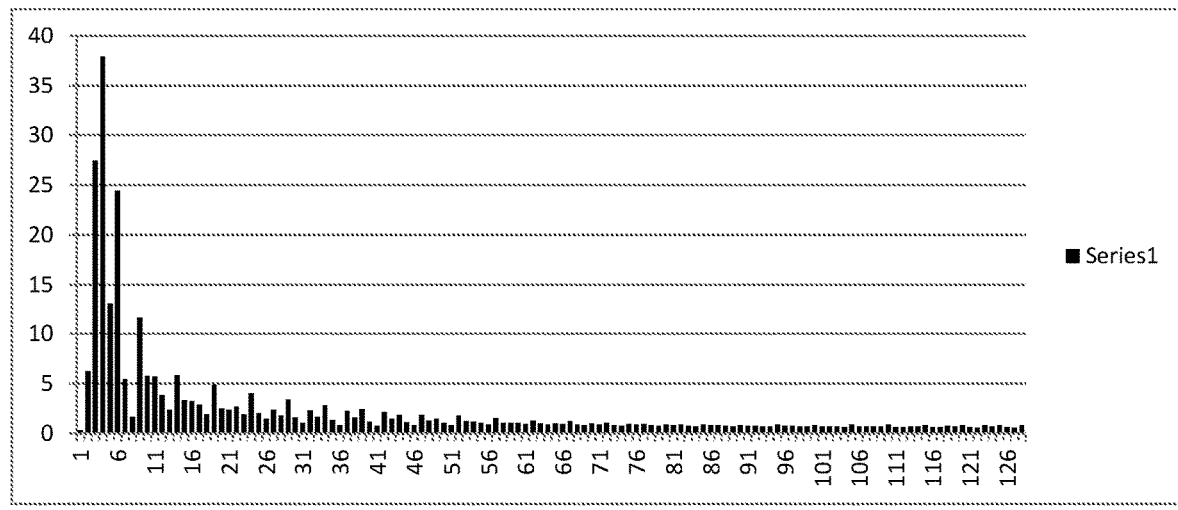
FIG. 17 is a chart of a power series for the genuine data in FIG. 16.

FIG. 17 is a power series from the original genuine autocorrelation data used for FIG. 16. It can clearly be seen that the spectrum is dominated by low frequencies.

Figure 18:
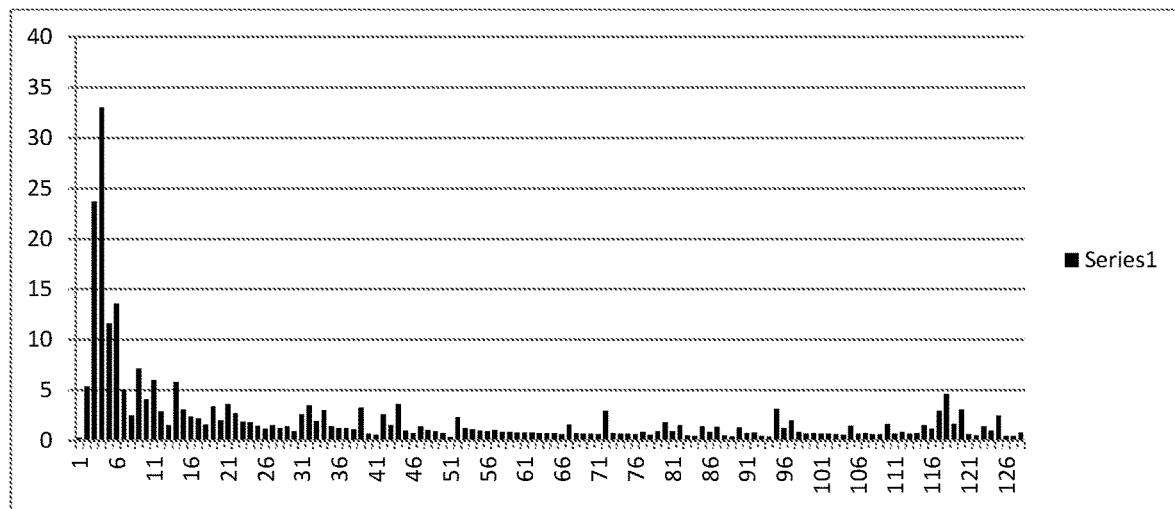
FIG. 18 is a chart similar to FIG. 17 for the "candidate" data in FIG. 16.

FIG. 18 is a power series similar to FIG. 17 from a cell phone acquired image of the genuine item of FIG. 17. Some image noise is present, but the overall power spectrum closely matches the genuine spectrum, with the same dominance of low frequency components.

Figure 19:
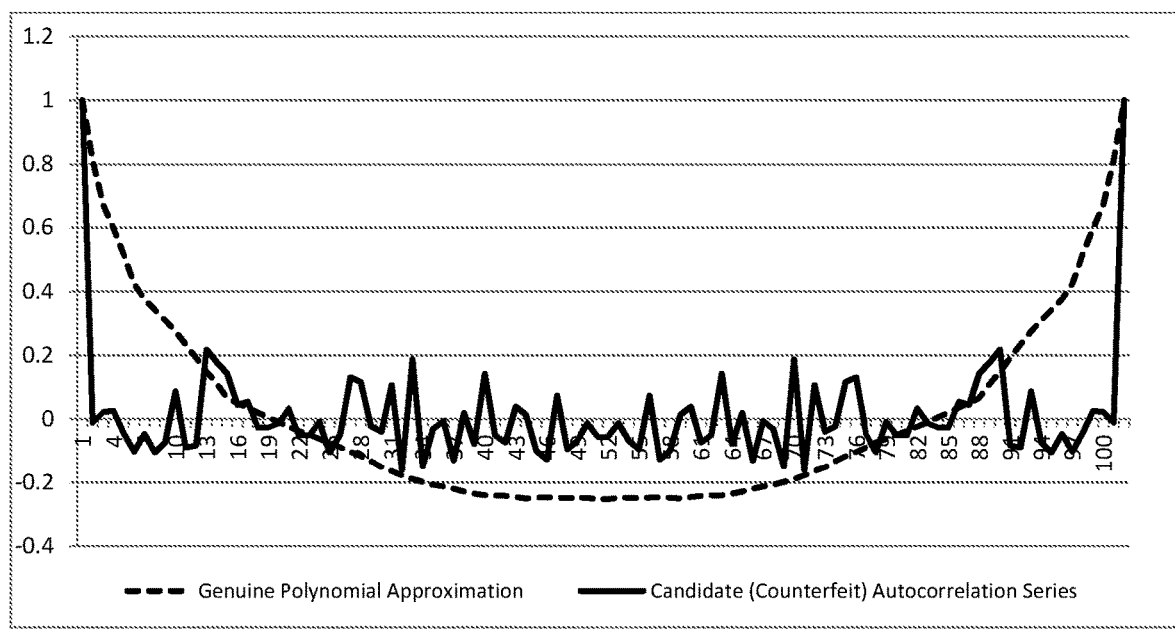
FIG. 19 is a graph similar to FIG. 17 for a counterfeit "candidate" symbol.

FIG. 19 shows a comparison of the autocorrelation series for a single metric between the polynomial approximation for a genuine item and a candidate symbol (here a counterfeit). There is considerable disagreement, and the candidate autocorrelation is noticeably more jagged than in FIG. 16. The numeric correlation between the two series is low (<5%), and the jagged shape of the data is also apparent in the DFT analysis (below).

Figure 20:
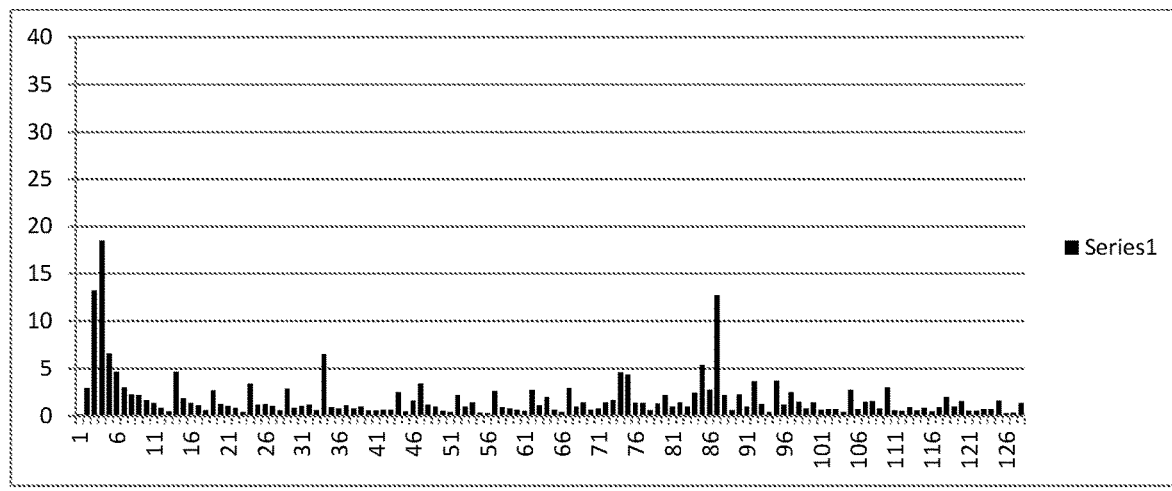
FIG. 20 is a chart similar to FIG. 17 for the counterfeit data used in FIG. 19.

FIG. 20 shows the power series from the cell phone acquired image of the counterfeit symbol of plot 4. Note how the low frequency components are diminished with the total spectral energy now spread out to include significant portions of the higher frequency range.

Evaluating Photocopy Probability Value

Figure 14:
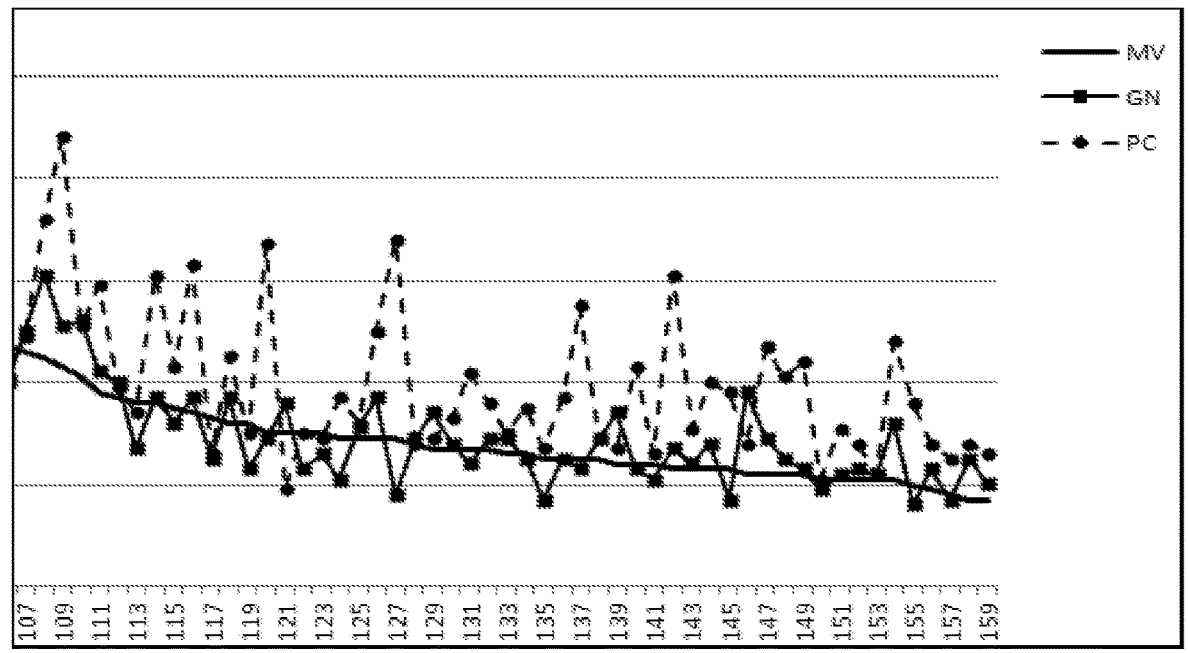
FIG. 14 is a detail of FIG. 13, to a larger scale than FIG. 13.

If a weighted aggregate score for all the available metrics is computed for results such as those shown in FIGS. 13 and 14, a genuine candidate mark will typically have an appreciably better match to the original mark than a photocopy candidate mark will. The difference between the two candidate marks is not large, and on a simple comparison between the candidate mark and the original data, it is not always easy to discriminate between the photocopy and the genuine candidate. However, as can be seen even by simple inspection of FIG. 13, the discrepancy is more pronounced in the low-value data that is shown in close-up in FIG. 14. Therefore, by assessing the match between the original mark data and the candidate mark data separately for high and low magnitude ranges, and comparing the two assessments, a much more confident discrimination between the original and photocopy candidates can be made.

In an example, the comparison may be expressed by P=ABS((r1−r2)/(r1+2)) where: P is a photocopy probability score; r1 is an aggregate match score between the genuine and candidate signatures for the first range (left side of FIG. 13); r2 is an aggregate match score between the genuine and candidate signatures for the second range (right side of FIG. 13).

In a test using 135 sample marks and their photocopies, using the 100 most prominent artifacts (corresponding to artifacts 1 to 100 of FIG. 13) for r1 and 100 less prominent artifacts (corresponding to artifacts 61 to 160 of FIG. 13) for r2, and using the a polynomial approximation of the autocorrelation value described above for the assessment, only 9 genuine candidate marks had P values higher than 0.2, and only one had a P value higher than 0.4. Only 9 photocopy marks had P values lower than 0.2, and only 21 had P values lower than 0.4. By choosing a suitable threshold for P (approximately 0.2 on these data), photocopies were identified with better than 85% accuracy.

Statistical Variance of Sub-Threshold Data

Photocopy detection can be further advanced by considering how the "sub threshold" data distribution, range and standard deviation of the candidate mark compare to the original sub threshold values. For this purpose, "sub threshold" data are data for modules that in the original data capture did not show any artifact sufficiently large to be distinguished reliably from random noise. While the exact data values are generally not useful in directly applying autocorrelation or other analysis to the small-signal region (because the "noise" present in the acquisition of a candidate image easily overwhelms any "actual" values of the extracted metric data), photocopy artifacts add to that noise in a measurable manner. A sub-threshold data noise baseline can therefore be characterized in acquired candidate images, and if that baseline is exceeded in one or more measurements (error sums, standard deviation, etc.), that can be taken as indicating that another process is at work adding variability to what should be a smaller, lower amplitude range data.

Using only the sub-threshold test of US 2013/0228619, which merely confirms that a detectable artifact has not appeared in a previously artifact-free module, a photocopy of a genuine mark is usually not apparent. A photocopy does affect a mark's metrics, but typically does so by superimposing a change (visual noise, uniformity variance, etc.) on every module within the symbol. Thus, when evaluated via autocorrelation of the sorted list, the photocopy looks genuine—the effect amounts to a "DC offset" of the autocorrelation curve, or the addition of a constant, which has minimal effect when the curve fit error is calculated. However, if looking at the sub-threshold region from the standpoint of how uniform the set of sub-threshold data is compared to that of a genuine item (range, standard deviation, etc.), it can be seen that, in effect, a new metric characterizing that uniformity is created. It turns out that, when photocopied, highly uniform regions become less uniform in a chaotic manner; that is, the sub-threshold data, being of relatively low variance in the genuine item mark, tends to be a more variable set of values in a photocopy, but all while still remaining generally below the sub threshold limit value.

When the sub-threshold regions for genuine and photocopy candidate marks are plotted against the original signature data for the same mark as illustrated by FIG. 14, it can be seen that the values comprising the sub-threshold data for the photocopies are much more variable than for the genuine item data.

Several numerical methods can be brought to bear in pursuit of photocopy detection using the data in this region. A first method is an Error Sum approach. Here the running sum of the differences between the original mark signature sub-threshold data and the candidate mark sub-threshold data are calculated. As may be seen from FIG. 14, this is visibly greater in photocopies than genuine candidate marks. In a cumulative plot of running sum against number of modules, the curves for photocopy signature data diverge from the original signature data faster than do the curves for genuine candidate mark signature data. It is a simple matter therefore to apply a rate of growth limit to this error sum value and use it to indicate the presence of a photocopy-like signal in the sub-threshold regions of candidate signature metrics data. Other statistical methods may also be applied to this data region.

Examining Inertia Moments of the Gray Level Co-Occurrence Matrix (GLCM)

In an alternative embodiment, texture analysis is employed to evaluate homogenous regions for variations created in the photocopying process. The Inertia (a statistical measure of contrast) in symbol features is compared to the same Inertia recorded during the metrics extraction of the original genuine mark signatures. An increase in the GLCM Inertia statistic indicates that the candidate mark may be a photocopy reproduction of the genuine mark. In some instances, for example, where the symbol is printed on a speckled substrate that might give a false baseline, the ratio of the Inertia for the target dark module to the Inertia for an adjacent light module may give a more accurate result than a simple measure of the Inertia for the dark module. The symbol features chosen are modules that are solidly black in the original mark. Typically, they are identified as modules at the bottom of the magnitude sorted list for black modules with white voids, or for black modules that are lighter than the nominal blackness. A high inertia value indicates a module that is speckled black and white on the size scale of the pixels used for generating the GLCM. If the original module had a low inertia, and the candidate module has a much higher inertia, that implies an increase in speckling, which may be strong grounds for suspecting that the candidate is a photocopy. For a simple comparison, the sum of the inertia values may be calculated for all the analyzed cells in the original and candidate marks. If the sum for the candidate mark exceeds the sum for the original mark by more than a set threshold, that may be taken as indicating a photocopy.

Figure 21:
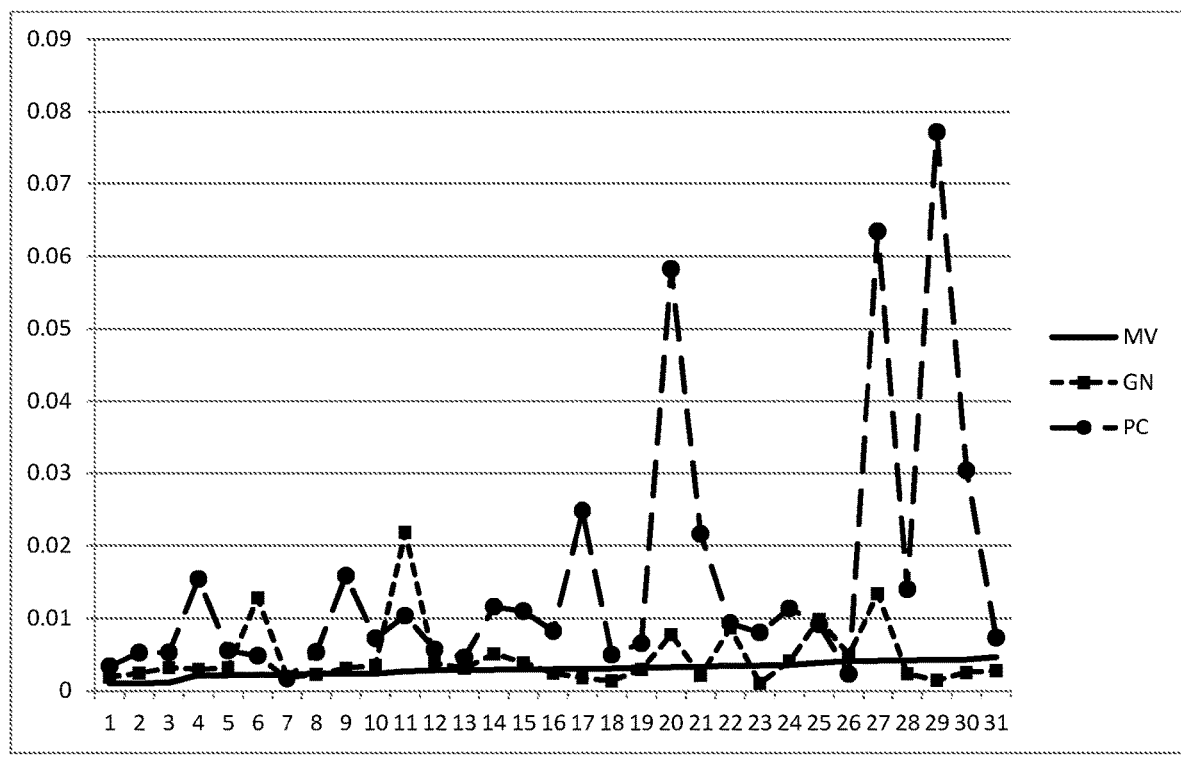
FIG. 21 is a graph of inertia moments for a contrast measurement.

Inertia moments (MI) test results were measured for several 2D Data Matrix test sets. Experimentally, this method was tested using the same data set as for the other methods, so the pixels used for the GLCM calculation were the same size as the smallest feature detectable in the other metrics, typically at least 500 pixels per module of a standard 2D Data Matrix. When learning the original genuine item signature for this metric, the MI was evaluated for each module within the mark, then sorted to give the highest weight to the most homogenous locations (lowest MI values). When evaluating a candidate mark, the MI values were extracted using the original genuine sort order, and the resulting data were analyzed. FIG. 21 is an example of a plot of MIs for the original genuine data, and for a genuine candidate mark and a photocopy of a genuine mark.

It is apparent from FIG. 21 that photocopies tend to exhibit elevated MI values as compared to the MI values found in the same regions within genuine marks. It is a simple matter therefore to establish a test for this condition. The areas below each of the plot lines may be integrated to establish a measure of the MI aggregate or MI area (AMI) across the evaluated regions within the mark. The difference dAMI between the original genuine MI area measurement and the candidate MI area measurement is then determined (dAMIgn for the genuine candidate tests and dAMIpc for the photocopies).

Summarizing the test results for FIG. 21 and two similar examples, it can be seen that:

| Example 1 (FIG. 21) | | |
| --- | --- | --- |
| Mark | AMI | dAMI |
| Original | 0.091828 | |
| Genuine Candidate | 0.144046 | 0.052217 |
| Photocopy | 0.469257 | 0.377429 |
| Example 2 | | |
| Original | 0.116458 | |
| Genuine Candidate | 0.212849 | 0.096391 |
| Photocopy | 2.358556 | 2.242098 |
| Example 3 | | |
| Original | 0.115055 | |
| Genuine Candidate | 0.119043 | 0.003988 |
| Photocopy | 0.357647 | 0.242592 |

It can be seen that the dAMI result is generally higher in photocopies of genuine marks than that found in the genuine marks themselves. At this point a simple threshold test can be applied to indicate the presence of possible photocopy artifacts within a candidate mark. This test for photocopy artifacts can be combined with any of the tests for a genuine mark described above or in our earlier US 2013/0228619.

The advantages of some or all of the disclosed embodiments may include, without limitation, the ability to uniquely identify an item by using a mark that has been placed on the item for another purpose, without the need to specifically introduce overt or covert elements for the purposes of anti-counterfeiting. A further advantage is that such identification can be very difficult to counterfeit. Further advantages include the ability to integrate the functions of the present invention into existing technologies commonly used to read barcode symbols, such as machine vision cameras, bar code readers and consumer "smart phones" equipped with cameras, without altering the primary behavior, construction or usability of the devices. Another advantage, in the case of a 2-dimensional barcode for example, is the ability to use the signature data as a means of providing a redundant data-carrier for the purpose of identifying an item.

In an instance where damage to the candidate mark makes it only partially readable, or makes it impossible to read and/or decode a data-carrying symbol, or the like, undamaged identifying features of only a portion of the mark may be sufficient to identify the mark. Once the candidate mark is thus identified with a genuine mark, the signature of the genuine mark can be retrieved from storage, and any information that was incorporated into the signature, such as a serial number of the marked item, may be recovered from the retrieved signature instead of directly from the damaged mark. Thus, the signature data, either in combination with partially recovered encoded symbol information or not, can be used to uniquely identify an item. This has many advantages, particularly considering how a data carrying mark may be damaged during a marked item's transit through a manufacturer's supply chain. This challenge has commonly been addressed in the past by ensuring a data carrier is created with a very high quality or "grade" at the point of marking. The goal was to produce a mark of such high quality that it will still be fully readable even after undergoing significant degradation due to physical damage in the supply chain. That put an excessive burden of cost and reduced manufacturing yields on the producer of the item as he endeavored to ensure that only marks of the highest quality entered his supply chain. The present embodiment has the advantage of removing the need for producing marks of the highest quality while still providing a way of identifying unreadable marks that cannot be decoded in the normal way because of symbol damage.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The invention is therefore not limited by the above described embodiments, methods, and examples, but extends to all embodiments and methods within the scope and spirit of the disclosure.

For example, an example of features of a 2-D barcode is described with reference to FIG. 5. An example of features of a 1-D barcode is described with reference to FIG. 15. As mentioned above, other symbols, such as a company logo, may be used as a target symbol. The features, and the specific variations in those features, that are used as signature metrics are almost limitless, and it is within the ordinary skill in the art, with understanding of the present specification, to choose a suitable or available symbol, and to choose suitable metrics and features, to put into effect the present methods. In some embodiments, the mark need not be applied with a view to extracting signature data according to the present methods. Instead, a mark that had already been created could be used, provided that it contains suitable artifact features.

Where an original mark is applied to an original item, and/or an original item is appended to an original object, the mark or item may contain information about the item or object. In that case, the above-described methods and systems may include verifying information about the item or object that is included in the mark or item, even when the underlying item or object is not physically replaced or altered. For example, where an object is marked with an expiry date, it may be desirable to reject an object with an altered expiry date as "not authentic" even if the object itself is the original object. Embodiments of the present systems and methods will produce that result, if the artifacts used for verification are found in the expiry date, for example, as imperfections of printing. Other information, such as lot numbers and other product tracking data, may similarly be verified.

The embodiments have been described primarily in terms of acquiring an entire 2-D barcode for signature data. However, the mark may be divided into smaller zones. Where the original mark is large enough, and has enough artifacts that are potential signature data, only one, or fewer than all, zones may be acquired and processed. Where more than one zone is acquired and processed, the signature data from different zones may be recorded separately. That is especially useful if the mark is a symbol encoding data with error correction, and the error correction relates to zones smaller than the entire symbol. Then, if the error correction indicates that part of the candidate symbol is damaged, the signature data from the damaged part can be disregarded.

In the interests of simplicity, specific embodiments have been described in which the artifacts are defects in printing of a printed mark, applied either directly to the item that is to be verified, or to a label applied to an object that is to be verified. However, as has already been mentioned, any feature that is sufficiently detectable and permanent, and sufficiently difficult to duplicate, may be used.

Some of the embodiments have been described as using a database of signature data for genuine items, within which a search is conducted for a signature data that at least partially matches the signature data extracted from a candidate mark. However, if the candidate item is identified as a specific genuine item in some other way, a search may be unnecessary, and the signature data extracted from the candidate mark may be compared directly with the stored signature data for the specific genuine item.

Accordingly, reference should be made to the appended claims, rather than to the foregoing specification, as indicating the scope of the invention.

The invention claimed is:

1. An anti-counterfeiting method, the method comprising printing a genuine barcode;
photographing an image of the printed genuine barcode;
carrying out an image processing operation on the image of the printed genuine barcode, the image processing operation comprising:
superimposing a best-fit grid on the image;
extracting edge linearities of a plurality of modules of the image with respect to the best-fit grid;
generating a list of the plurality of modules of the image of the printed genuine barcode, wherein the list is sorted based at least in part on the magnitudes of their respective extracted linearities;
transmitting the sorted list to a computer storage device;
acquiring an image of a printed candidate barcode;
carrying out the image processing operation on the image of the printed candidate barcode;
generating a list for the plurality of modules of the image of the printed candidate barcode, wherein the list is sorted based at least in part on the magnitudes of their respective extracted linearities;
retrieving the sorted list for the genuine barcode from computer storage device in a first range of magnitudes, comparing the sorted list for the image of the printed genuine barcode with the sorted list for the image of the printed candidate barcode;

in a second range of magnitudes, comparing the sorted list for the image of the printed genuine barcode with the sorted list for the image of the printed candidate barcode, wherein the second range is different from the first range; and when a difference between the sorted list for the image of the printed genuine barcode and the sorted list for the image of the printed candidate barcode is greater for the second range than for the first range by more than a threshold amount, alerting a user that the printed candidate barcode is not genuine.

2. The method of claim 1, wherein the difference is an average or aggregate difference in or ratio of magnitudes or a statistical measure of variation in magnitudes.

3. The method of claim 1, wherein the first and second ranges overlap.

4. The method of claim 1, further comprising calculating an autocorrelation series of the sorted list of modules for each of the first and second ranges.

\* \* \* \* \*